(12) United States Patent
Bennett et al.

(10) Patent No.: US 9,019,263 B2
(45) Date of Patent: Apr. 28, 2015

(54) COORDINATED DRIVING OF ADAPTABLE LIGHT MANIPULATOR, BACKLIGHTING AND PIXEL ARRAY IN SUPPORT OF ADAPTABLE 2D AND 3D DISPLAYS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 715 days.

(21) Appl. No.: 12/982,031

(22) Filed: Dec. 30, 2010

(65) Prior Publication Data
US 2011/0157167 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/04* (2006.01)
(Continued)

(52) U.S. Cl.
CPC .......... *H04N 13/0497* (2013.01); *G06F 3/14* (2013.01); *G09G 3/003* (2013.01); *G09G 3/20* (2013.01); *G09G 5/003* (2013.01); *G09G 5/14* (2013.01); *G09G 2300/023* (2013.01); *G09G 2320/028* (2013.01); *G09G 2370/04* (2013.01);
(Continued)

(58) Field of Classification Search
CPC ....... H04N 13/0003; G06F 3/14; H04S 7/303; G09G 3/20; G09G 5/003; G09G 5/14; G09G 2300/023; G09G 2320/028; G09G 2370/04
USPC ......... 345/419, 420, 428, 100, 102, 291, 690; 348/51; 359/245, 464
See application file for complete search history.

(56) References Cited

U.S. PATENT DOCUMENTS

| 4,829,365 A | 5/1989 | Eichenlaub |
| 5,615,046 A | 3/1997 | Gilchrist |

(Continued)

FOREIGN PATENT DOCUMENTS

| EP | 1662808 A1 | 5/2006 |
| EP | 1816510 A1 | 8/2007 |

(Continued)

OTHER PUBLICATIONS

"How browsers work", retrieved from <http://taligarsiel.com/Projects/howbrowserswork1.htm> on Oct. 21, 2010, 54 pages.

(Continued)

*Primary Examiner* — Phu K Nguyen
(74) *Attorney, Agent, or Firm* — Fiala & Weaver P.L.L.C.

(57) ABSTRACT

Methods, systems, and apparatuses are described for driving an adaptable light manipulator and a pixel array in a coordinated fashion so as to achieve a selected one of a plurality of possible viewing configurations of an adaptable two-dimensional/three-dimensional image display. Methods, systems, and apparatuses are also described for driving an adaptable light manipulator, a pixel array and a non-uniform light generator in a coordinated fashion so as to achieve a selected one of plurality of possible viewing configurations of an adaptable two-dimensional/three-dimensional image display.

21 Claims, 20 Drawing Sheets

(51) Int. Cl.

| | | |
|---|---|---|
| *G06F 3/14* | (2006.01) | |
| *G09G 3/00* | (2006.01) | |
| *G09G 3/20* | (2006.01) | |
| *H04N 13/00* | (2006.01) | |
| *H04N 21/235* | (2011.01) | |
| *H04N 21/41* | (2011.01) | |
| *H04N 21/435* | (2011.01) | |
| *G03B 35/24* | (2006.01) | |
| *H04S 7/00* | (2006.01) | |
| *G09G 5/00* | (2006.01) | |
| *G09G 5/14* | (2006.01) | |

(52) U.S. Cl.
CPC ....... *H04N13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0456* (2013.01); *H04N 13/0468* (2013.01); *H04N 21/235* (2013.01); *H04N 21/4122* (2013.01); *H04N 21/435* (2013.01); *H04N 2013/0463* (2013.01); *H04N 2013/0465* (2013.01); *G03B 35/24* (2013.01); *H04N 13/0413* (2013.01); *H04S 7/303* (2013.01)

(56) References Cited

U.S. PATENT DOCUMENTS

| | | | |
|---|---|---|---|
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A * | 4/2000 | Hamagishi | 359/464 |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 * | 4/2008 | Jacobs et al. | 359/245 |
| 7,440,193 B2 | 10/2008 | Gunasekaran et al. | |
| 7,511,774 B2 | 3/2009 | Lee et al. | |
| 7,626,644 B2 | 12/2009 | Shestak et al. | |
| 7,646,451 B2 | 1/2010 | Vogel et al. | |
| 7,692,859 B2 * | 4/2010 | Redert et al. | 359/478 |
| 7,885,079 B2 | 2/2011 | Chen et al. | |
| 7,911,442 B2 * | 3/2011 | Wang et al. | 345/102 |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,044,983 B2 * | 10/2011 | Nonaka et al. | 345/690 |
| 8,049,710 B2 | 11/2011 | Shestak et al. | |
| 8,072,411 B2 * | 12/2011 | Chen et al. | 345/100 |
| 8,139,024 B2 | 3/2012 | Daiku | |
| 8,154,686 B2 * | 4/2012 | Mather et al. | 349/65 |
| 8,154,799 B2 | 4/2012 | Kim et al. | |
| 8,174,564 B2 * | 5/2012 | Kim et al. | 348/51 |
| 8,183,788 B2 * | 5/2012 | Ma | 315/291 |
| 8,209,396 B1 | 6/2012 | Raman et al. | |
| 8,233,034 B2 * | 7/2012 | Sharp et al. | 348/51 |
| 8,284,119 B2 | 10/2012 | Kim et al. | |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,384,774 B2 | 2/2013 | Gallagher | |
| 8,400,392 B2 * | 3/2013 | Kimura et al. | 345/102 |
| 8,411,746 B2 | 4/2013 | Chen et al. | |
| 8,441,430 B2 * | 5/2013 | Lee | 345/102 |
| 8,466,869 B2 * | 6/2013 | Kobayashi et al. | 345/102 |
| 8,482,512 B2 * | 7/2013 | Adachi et al. | 345/102 |
| 8,487,863 B2 * | 7/2013 | Park et al. | 345/102 |
| 8,525,942 B2 * | 9/2013 | Robinson et al. | 349/15 |
| 8,587,642 B2 | 11/2013 | Shestak et al. | |
| 8,587,736 B2 * | 11/2013 | Kang | 349/15 |
| 8,605,136 B2 | 12/2013 | Yu et al. | |
| 8,687,042 B2 * | 4/2014 | Karaoguz et al. | 348/42 |
| 8,766,905 B2 * | 7/2014 | Adachi | 345/102 |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1 | 12/2004 | Alden | |
| 2005/0073472 A1 | 4/2005 | Kim et al. | |
| 2005/0128353 A1 | 6/2005 | Young et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0050785 A1 | 3/2006 | Watanabe et al. | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1 | 11/2006 | Novack et al. | |
| 2007/0002041 A1 | 1/2007 | Kim et al. | |
| 2007/0008406 A1 | 1/2007 | Shestak et al. | |
| 2007/0008620 A1 | 1/2007 | Shestak et al. | |
| 2007/0052807 A1 | 3/2007 | Zhou et al. | |
| 2007/0072674 A1 | 3/2007 | Ohta et al. | |
| 2007/0085814 A1 | 4/2007 | Ijzerman et al. | |
| 2007/0096125 A1 | 5/2007 | Vogel et al. | |
| 2007/0097103 A1 | 5/2007 | Yoshioka et al. | |
| 2007/0097208 A1 | 5/2007 | Takemoto et al. | |
| 2007/0139371 A1 | 6/2007 | Harsham et al. | |
| 2007/0146267 A1 | 6/2007 | Jang et al. | |
| 2007/0147827 A1 | 6/2007 | Sheynman et al. | |
| 2007/0153916 A1 | 7/2007 | Demircin et al. | |
| 2007/0162392 A1 | 7/2007 | McEnroe et al. | |
| 2007/0270218 A1 | 11/2007 | Yoshida et al. | |
| 2007/0296874 A1 | 12/2007 | Yoshimoto et al. | |
| 2008/0025390 A1 | 1/2008 | Shi et al. | |
| 2008/0037120 A1 | 2/2008 | Koo et al. | |
| 2008/0043096 A1 | 2/2008 | Vetro et al. | |
| 2008/0043644 A1 | 2/2008 | Barkley et al. | |
| 2008/0068329 A1 | 3/2008 | Shestak et al. | |
| 2008/0126557 A1 | 5/2008 | Motoyama et al. | |
| 2008/0133122 A1 | 6/2008 | Mashitani et al. | |
| 2008/0150853 A1 | 6/2008 | Peng et al. | |
| 2008/0165176 A1 | 7/2008 | Archer et al. | |
| 2008/0168129 A1 | 7/2008 | Robbin et al. | |
| 2008/0184301 A1 | 7/2008 | Boylan et al. | |
| 2008/0191964 A1 | 8/2008 | Spengler | |
| 2008/0192112 A1 | 8/2008 | Hiramatsu et al. | |
| 2008/0246757 A1 | 10/2008 | Ito | |
| 2008/0259233 A1 | 10/2008 | Krijn et al. | |
| 2008/0273242 A1 | 11/2008 | Woodgate et al. | |
| 2008/0284844 A1 | 11/2008 | Woodgate et al. | |
| 2008/0303832 A1 | 12/2008 | Kim et al. | |

(56) References Cited

U.S. PATENT DOCUMENTS

| | | |
|---|---|---|
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | |
|---|---|---|
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", Ph.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa "Stereoscopic Display Technique for Web3D Images", SIGGRAPH 2009, New Orleans, Louisiana, Aug. 3-7, 2009, 1 page.

"Displaying Stereoscopic 3D (S3D) with Intel HD Graphics Processors for Software Developers", Intel, Aug. 2011, pp. 1-10.

Liao, et al., "The Design and Application of High-Resolution 3D Stereoscopic graphics Display on PC", Purdue University School of Science, 2000, 7 pages.

Fono, et al., "EyeWindows: Evaluation of Eye-Controlled Zooming Windows for Focus Selection", CHI 2005, Papers: Eyes on Interaction, Portland, Oregon, (Apr. 2-7, 2005), pp. 151-160.

Kumar, et al., "Eye Point: Practical Pointing and Selection Using Gaze and Keyboard", CHI 2007, (Apr. 28-May 3, 2007), 10 pages.

Ko, et al, "Facial Feature Tracking and Head Orientation-Based Gaze Tracking", ETRI, 2000, 4 pages.

Ruddarraju et al., "Perceptual User Interfaces Using Vision-Based Eye Tracking", ICMI, Nov. 2003, 7 pages.

\* cited by examiner

COORDINATED DRIVING OF ADAPTABLE LIGHT MANIPULATOR, BACKLIGHTING AND PIXEL ARRAY IN SUPPORT OF ADAPTABLE 2D AND 3D DISPLAYS

CROSS-REFERENCE TO RELATED APPLICATIONS

This application claims the benefit of U.S. Provisional Patent Application No. 61/291,818, filed on Dec. 31, 2009, and U.S. Provisional Patent Application No. 61/303,119, filed on Feb. 10, 2010. The entirety of each of these applications is incorporated by reference herein.

This application is also related to the following U.S. patent applications, each of which also claims the benefit of U.S. Provisional Patent Application Nos. 61/291,818 and 61/303, 119 and each of which is incorporated by reference herein:

U.S. patent application Ser. No. 12/774,225, filed on May 5, 2010, and entitled "Controlling a Pixel Array to Support an Adaptable Light Manipulator";

U.S. patent application Ser. No. 12/774,307, filed on May 5, 2010, and entitled "Display with Elastic Light Manipulator";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views"; and U.S. patent application Ser. No. 12/982,020, filed on even date herewith and entitled "Backlighting Array Supporting Adaptable Parallax Barrier".

BACKGROUND OF THE INVENTION

1. Field of the Invention

The present invention relates to systems and methods for driving screen elements of three-dimensional image displays.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two dimensions. More recently, images are being provided in digital form for display in two dimensions on display devices having improved resolution (e.g., "high definition" or "HD"). Even more recently, images capable of being displayed in three dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye liquid crystal display (LCD) shutter glasses may be used with conventional two-dimensional image displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes of a layer of material with a series of precision slits. The parallax barrier is placed proximal to a display so that each of a user's eyes sees a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

Methods, systems, and apparatuses are described for driving an adaptable light manipulator and a pixel array in a coordinated fashion so as to achieve a selected one of a plurality of possible viewing configurations of an adaptable two-dimensional/three-dimensional image display. Methods, systems, and apparatuses are also described for driving an adaptable light manipulator, a pixel array and a non-uniform light generator in a coordinated fashion so as to achieve a selected one of plurality of possible viewing configurations of an adaptable two-dimensional/three-dimensional image display. The methods, systems and apparatuses are substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 12:
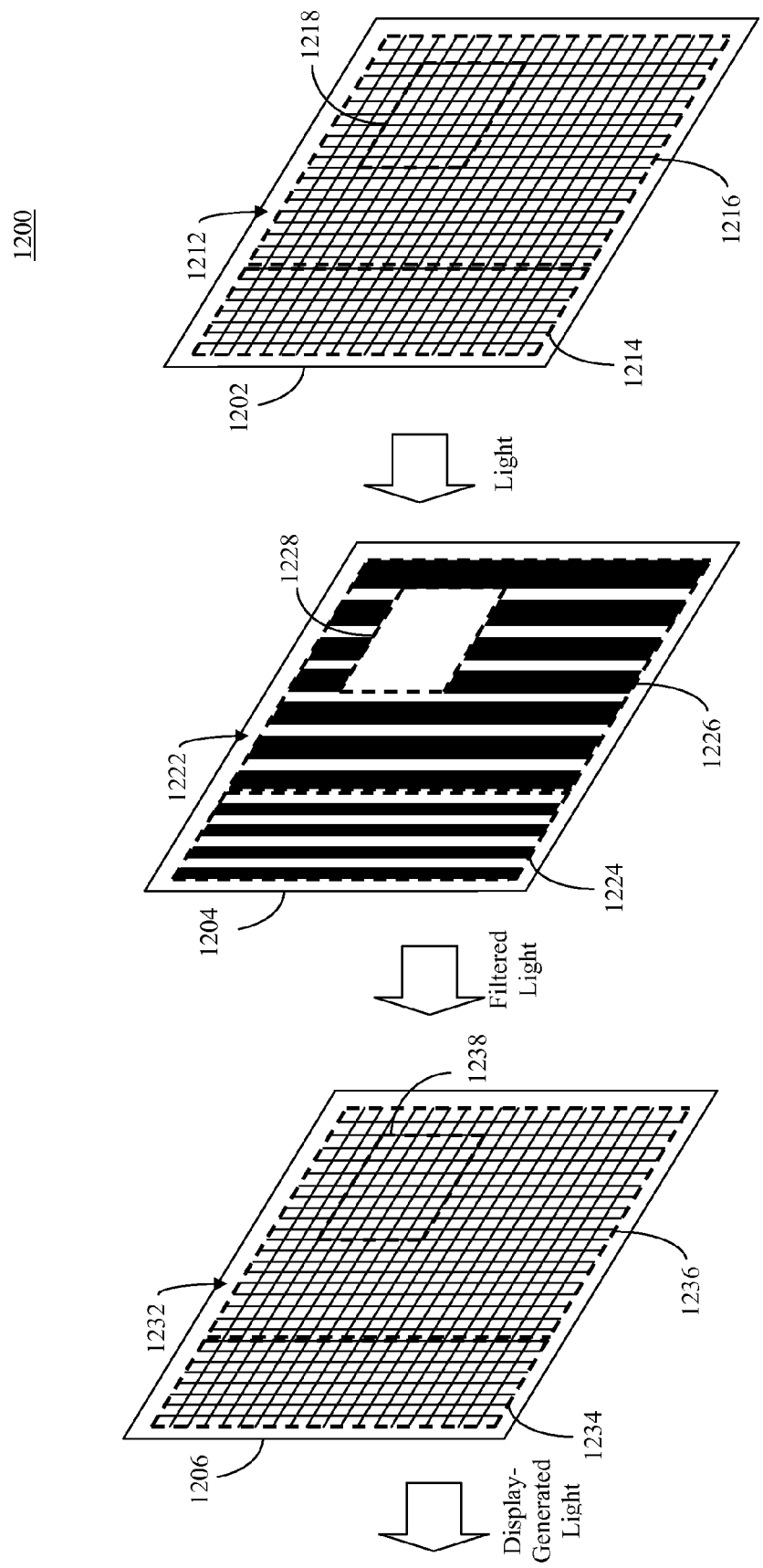

FIG. 12 provides an exploded view of a display system that utilizes a controllable backlight array to provide regional luminosity control in accordance with an embodiment.

Figure 13:
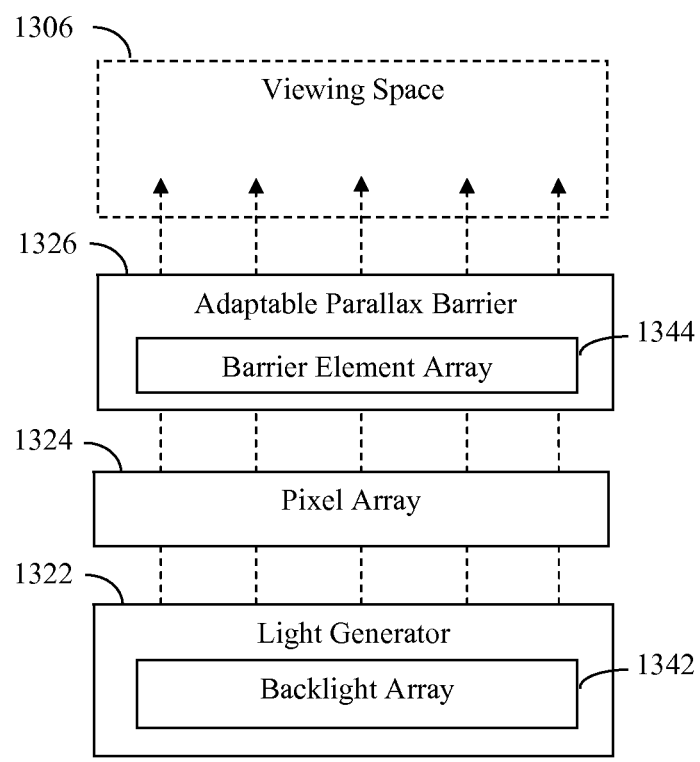

FIG. 13 is a block diagram of a display system that includes a pixel array disposed between a light generator and an adaptable parallax barrier in accordance with an embodiment.

Figure 14:
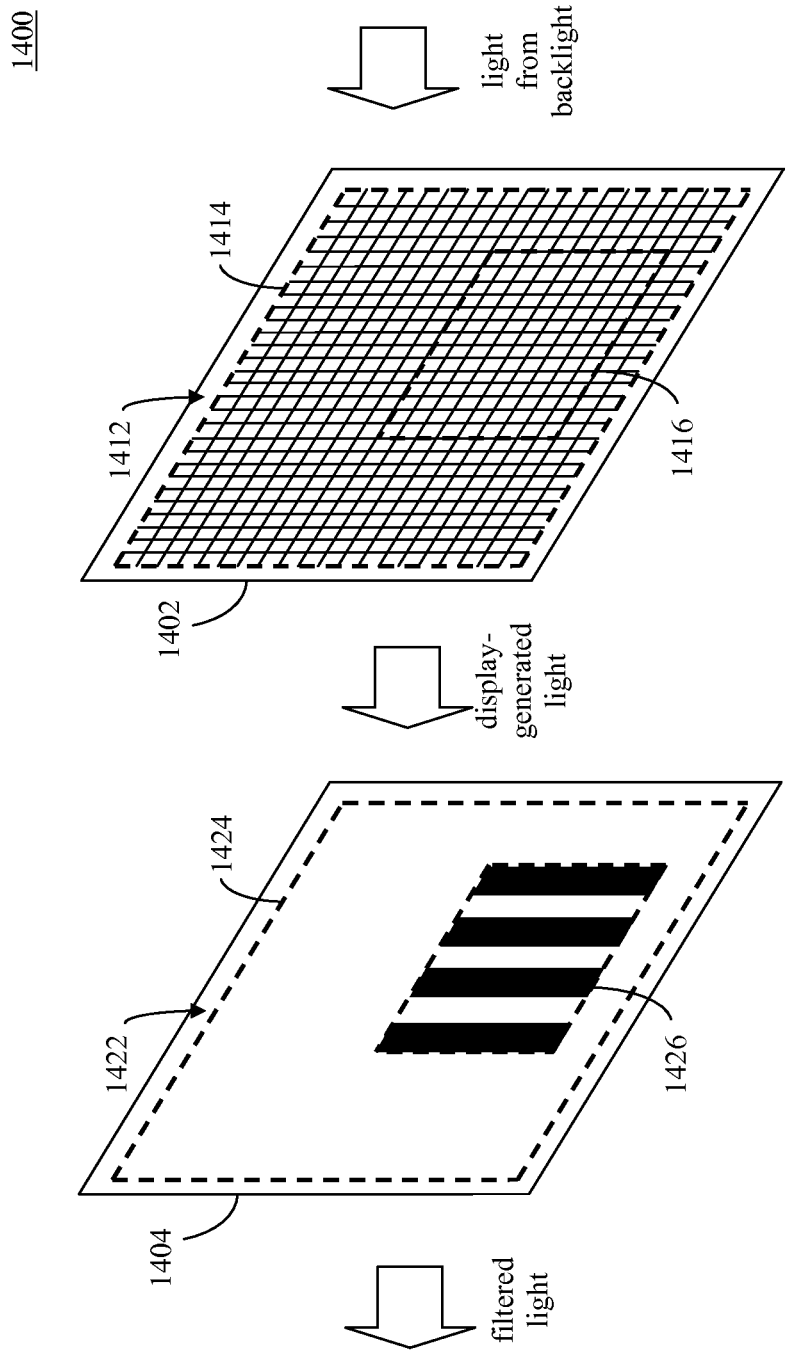

FIG. 14 provides an exploded view of a display system that implements a regional brightness control scheme based on pixel intensity in accordance with an embodiment.

Figure 15:
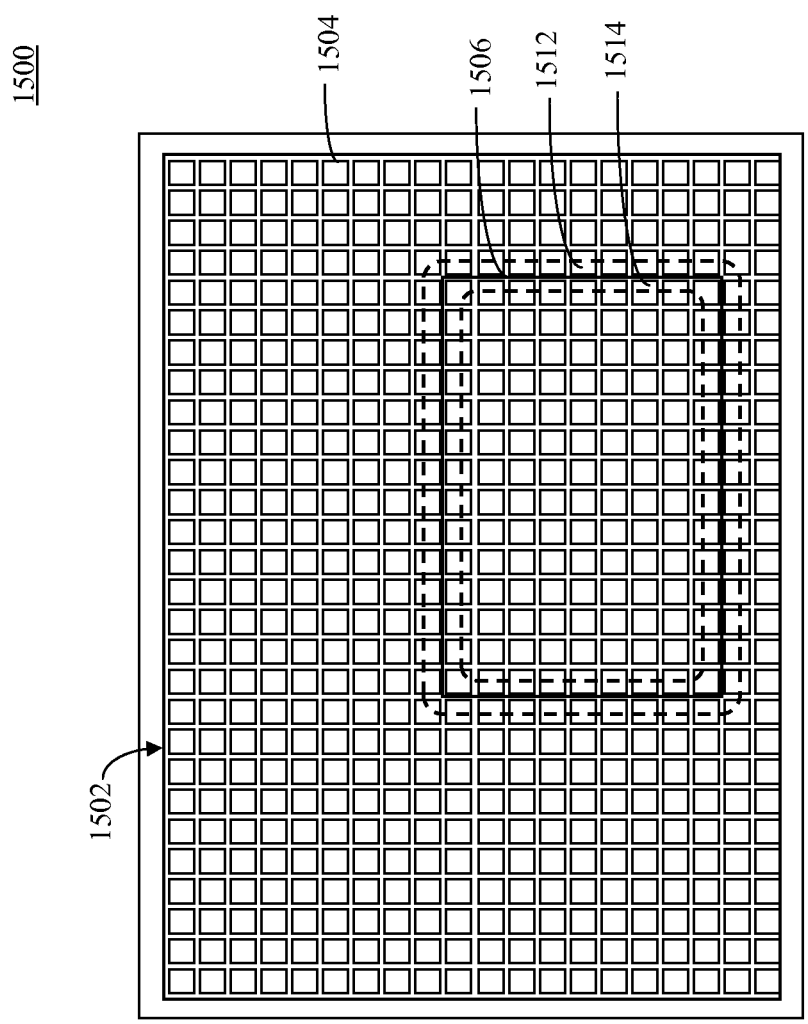

FIG. 15 illustrates a front perspective view of a display panel of a display system in accordance with an embodiment.

Figure 16:
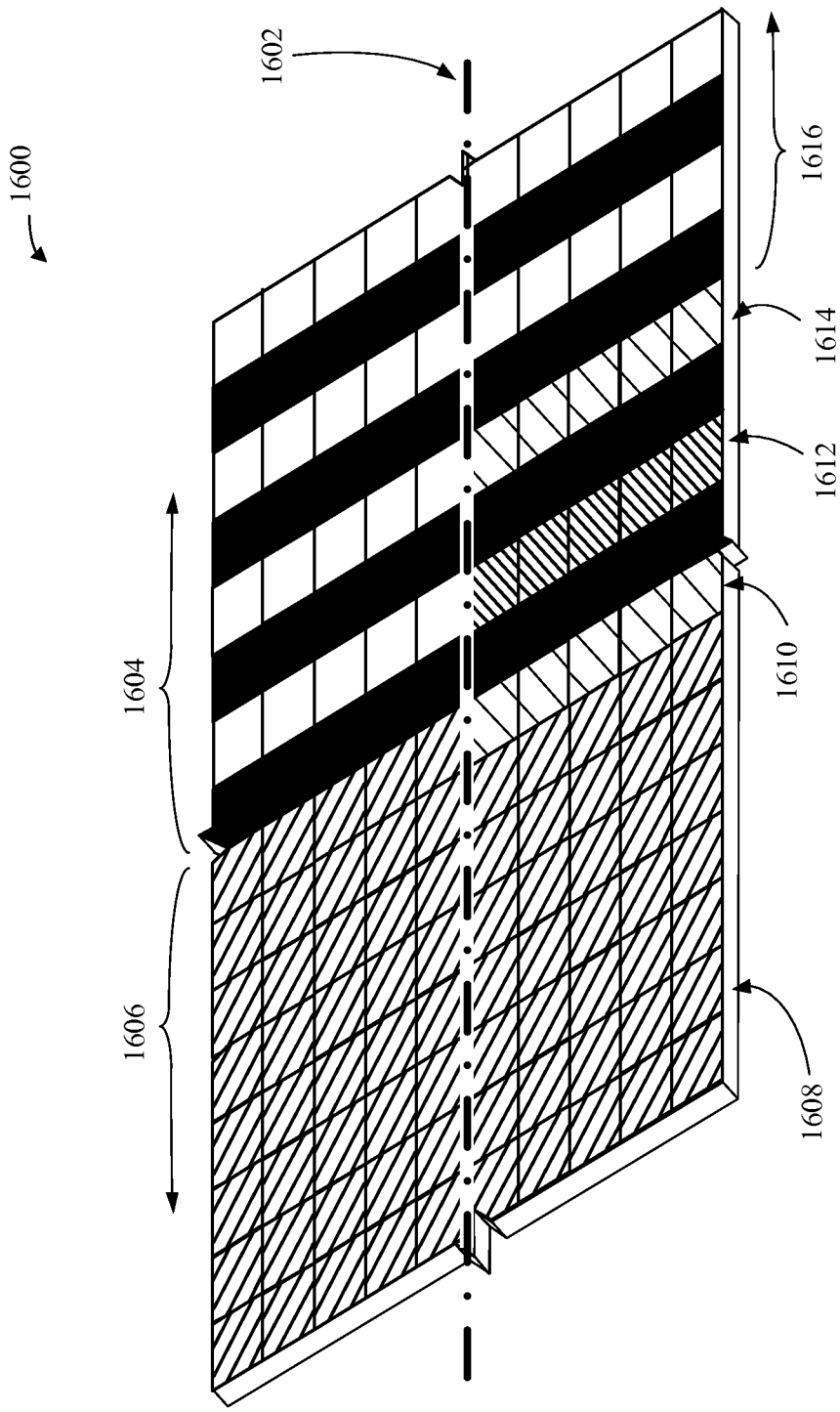

FIG. 16 illustrates two exemplary configurations of an adaptable light manipulator that includes a parallax barrier and a brightness regulation overlay in accordance with an embodiment.

Figure 17:
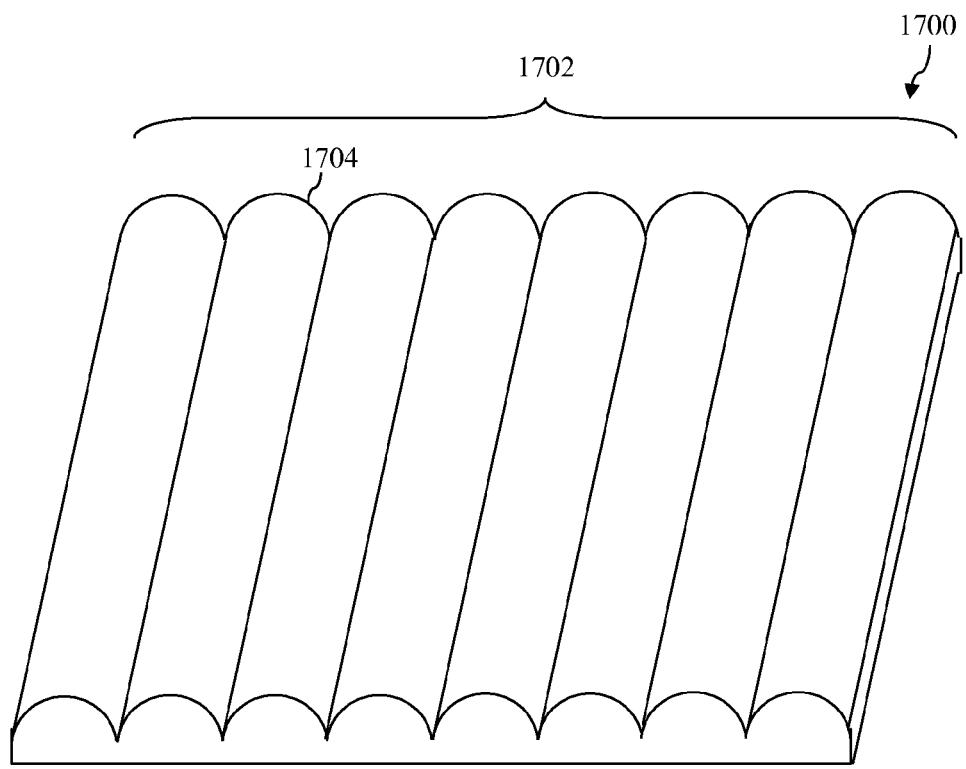

FIG. 17 shows a perspective view of an adaptable lenticular lens that may be used in a displays system in accordance with an embodiment.

Figure 18:
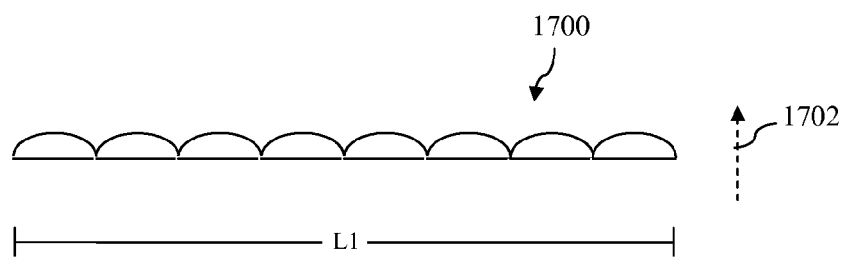

FIG. 18 shows a side view of the adaptable lenticular lens of FIG. 17.

Figure 19:
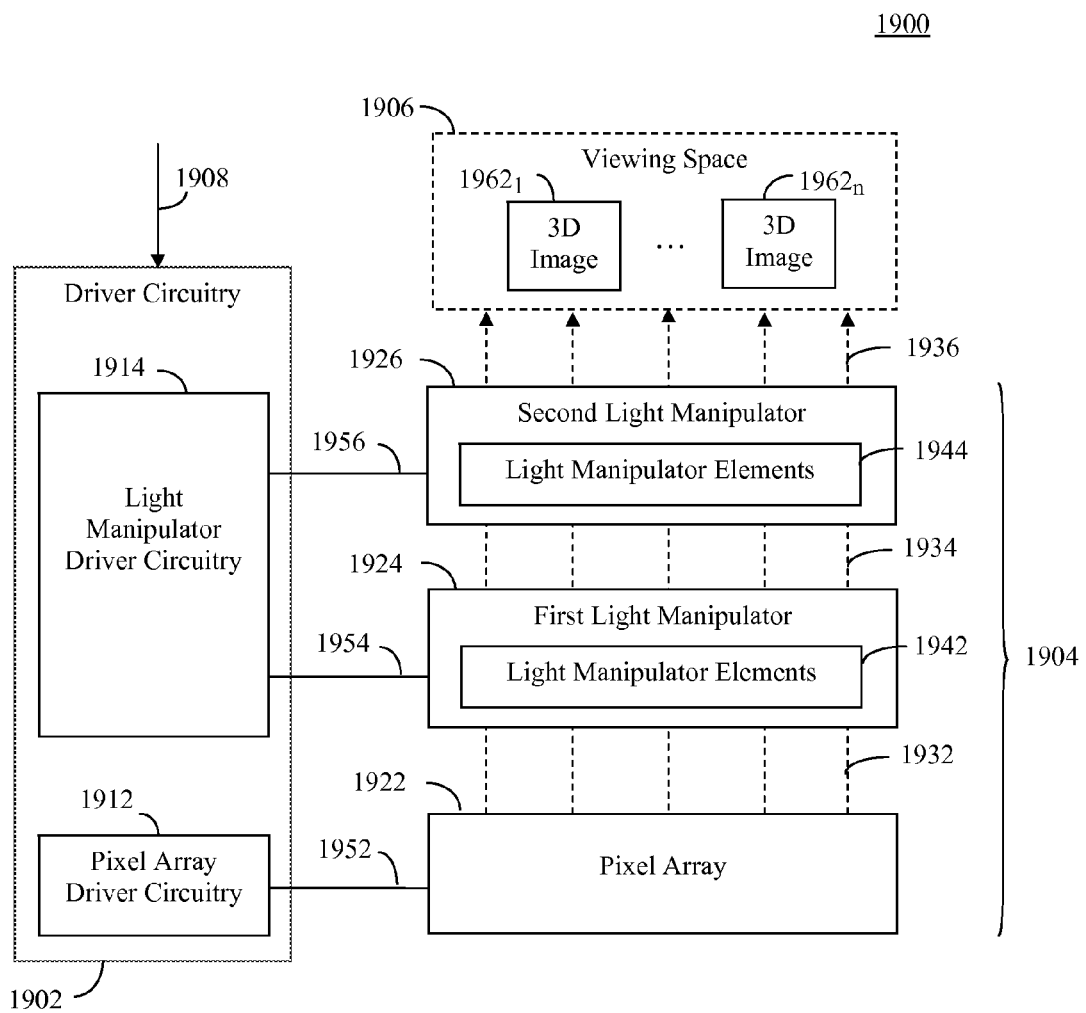

FIG. 19 is a block diagram of a display system that includes multiple light manipulator layers in accordance with an embodiment.

Figure 20:
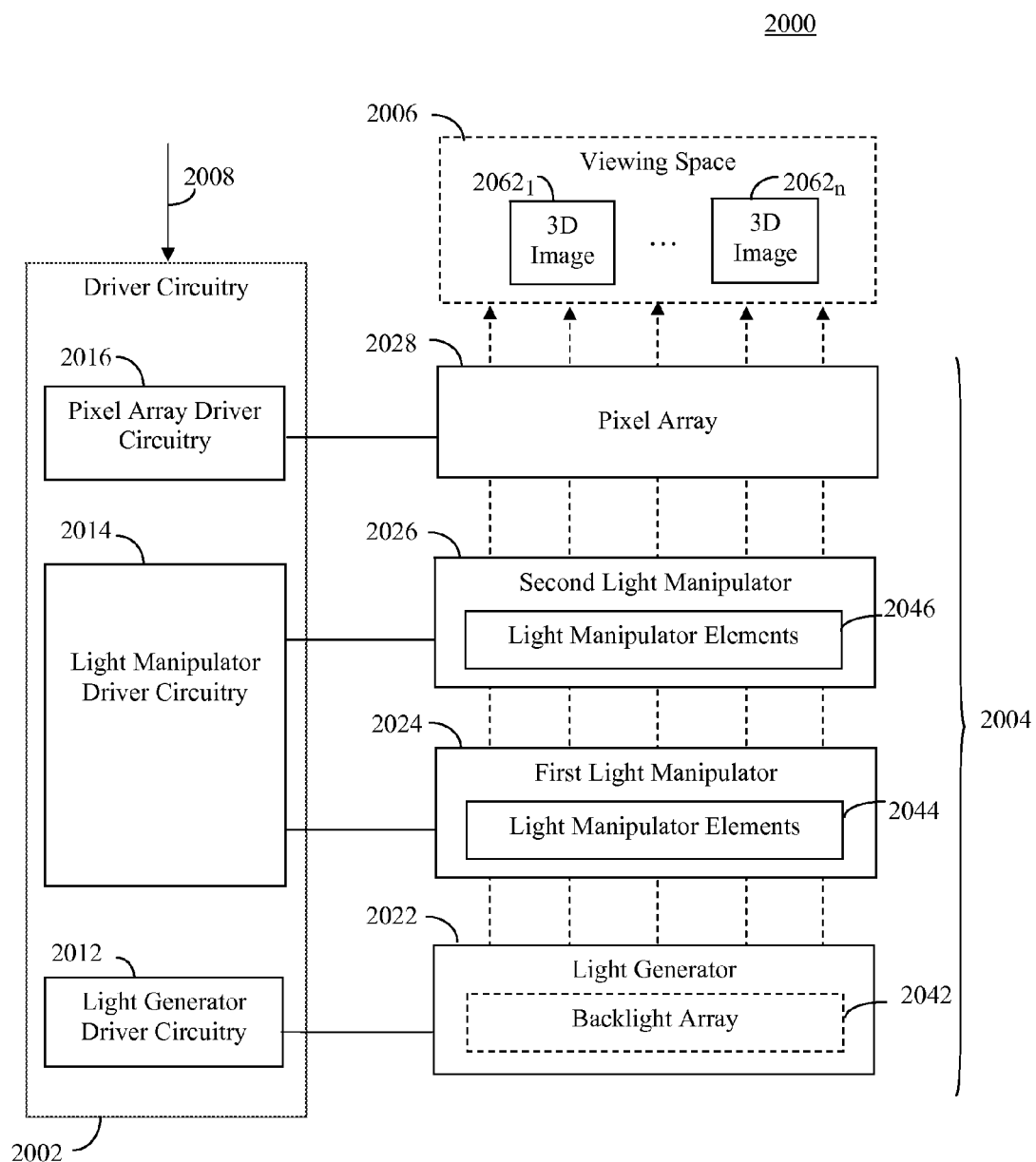

FIG. 20 is a block diagram of a display system that includes multiple light manipulator layers in accordance with an alternate embodiment.

Figure 21:
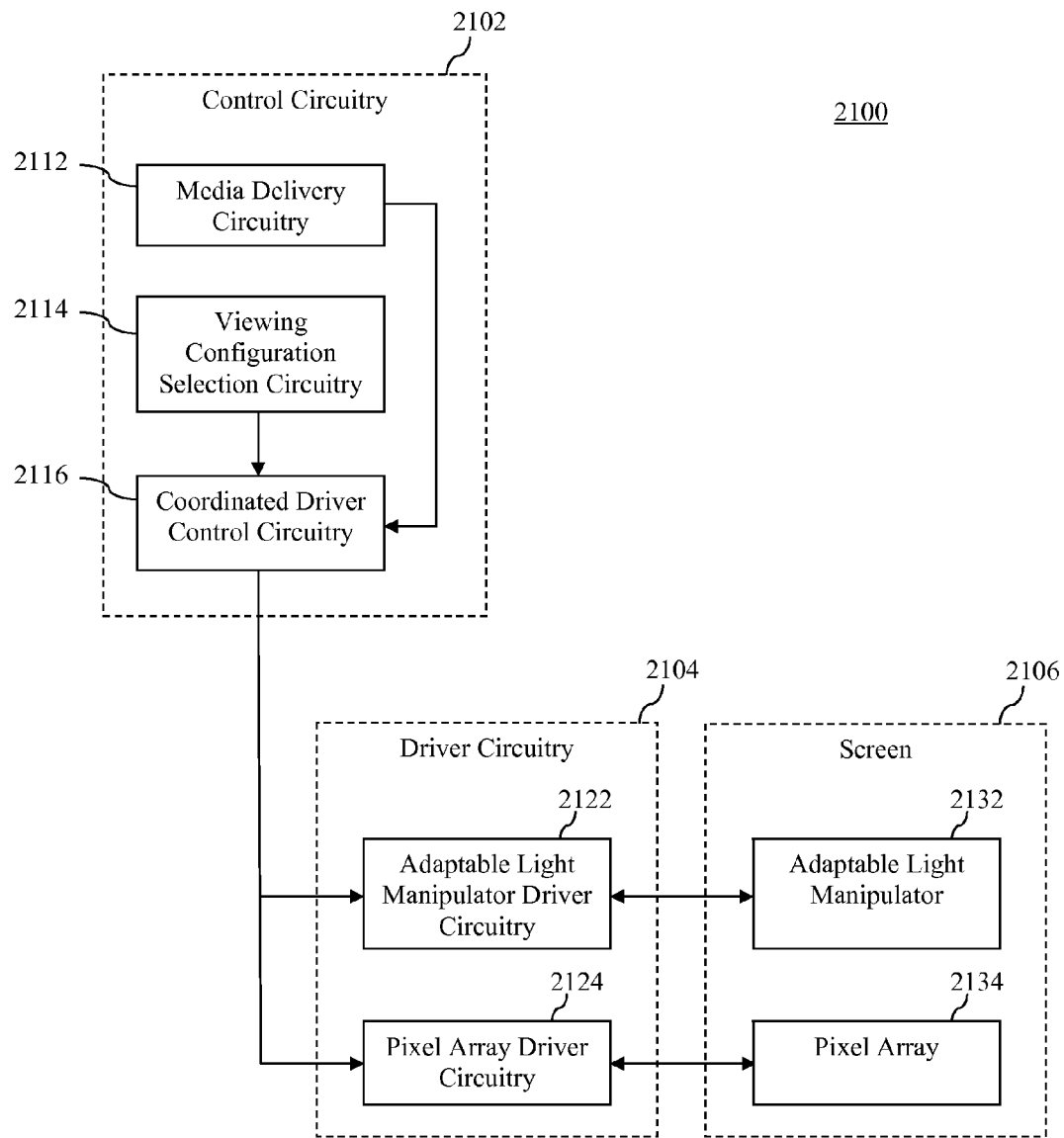

FIG. 21 is a block diagram of a display system that provides coordinated driving of an adaptable light manipulator and a pixel array in accordance with an embodiment.

Figure 22:
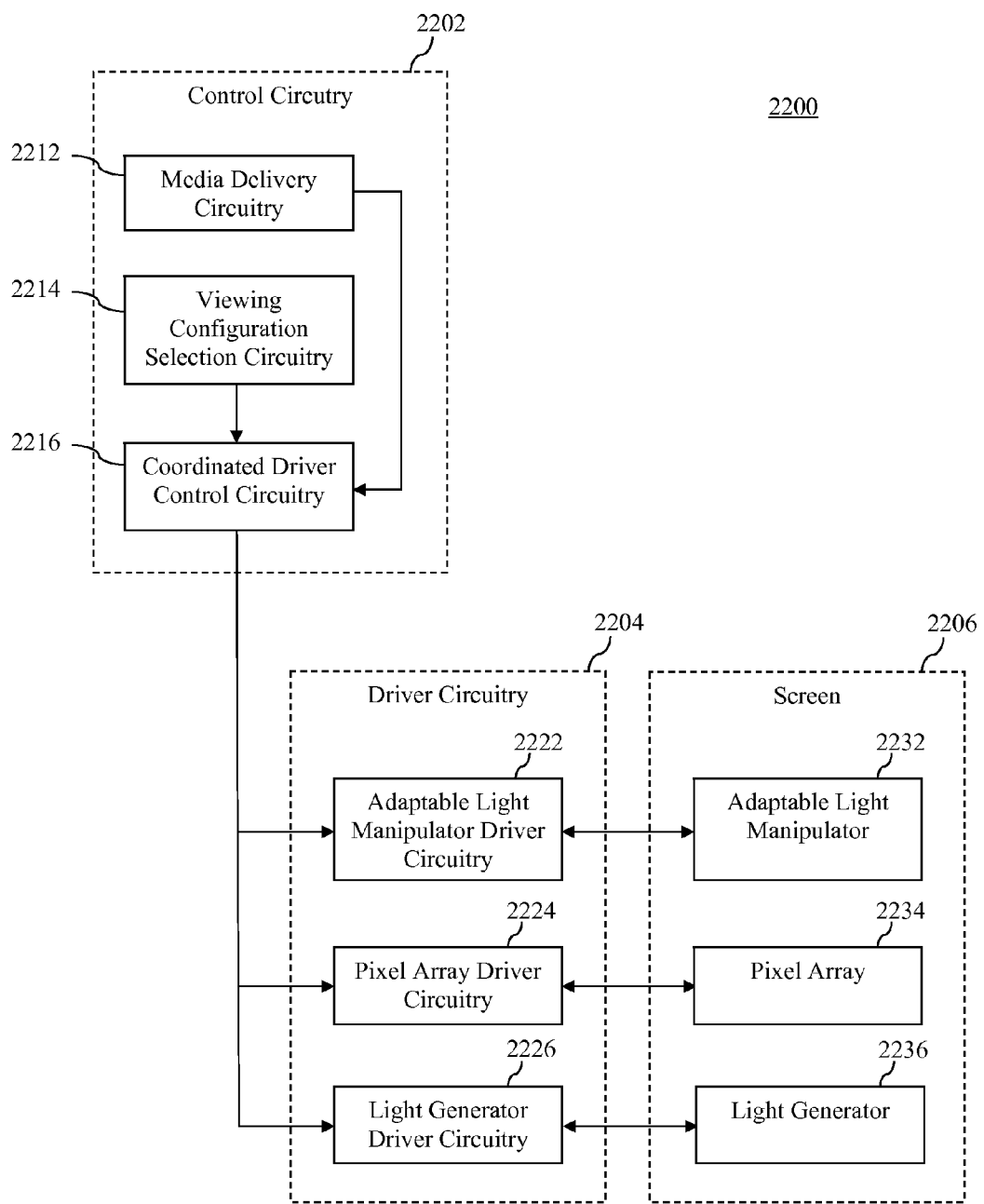

FIG. 22 is a block diagram of a display system that provides coordinated driving of an adaptable light manipulator, a pixel array and a light generator in accordance with an embodiment.

Figure 23:
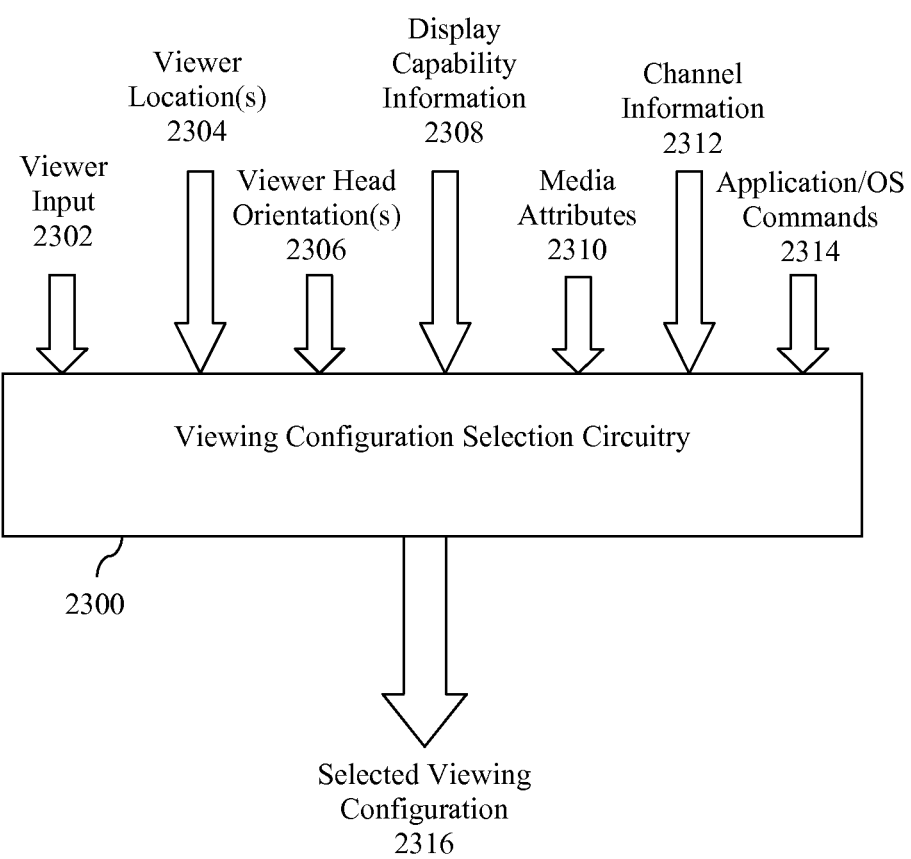

FIG. 23 is a block diagram showing example inputs to viewing configuration selection circuitry in accordance with an embodiment, the inputs providing a basis for the selection of a particular viewing configuration.

Figure 24:
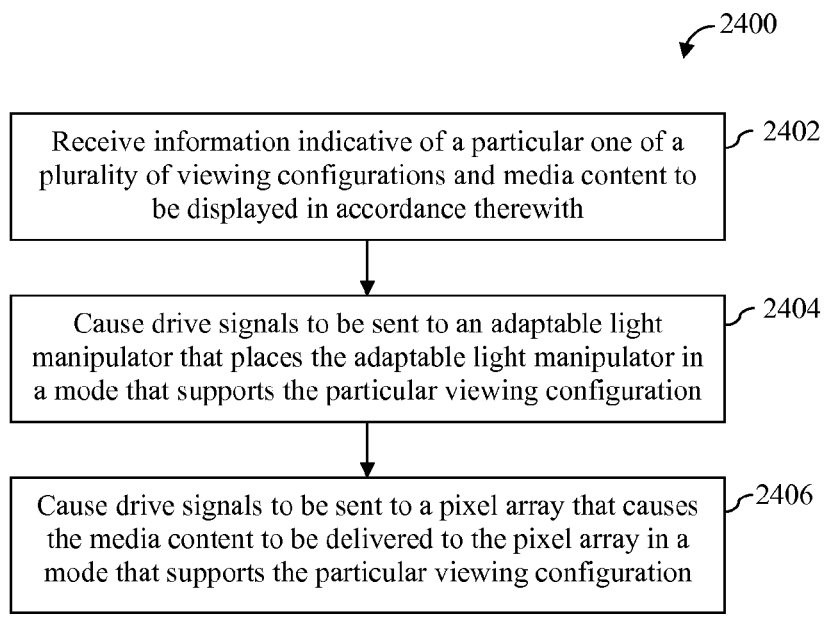

FIG. 24 depicts a flowchart of a method for providing coordinated control of an adaptable light manipulator and a pixel array that together comprise an adaptable display system in accordance with an embodiment.

Figure 25:
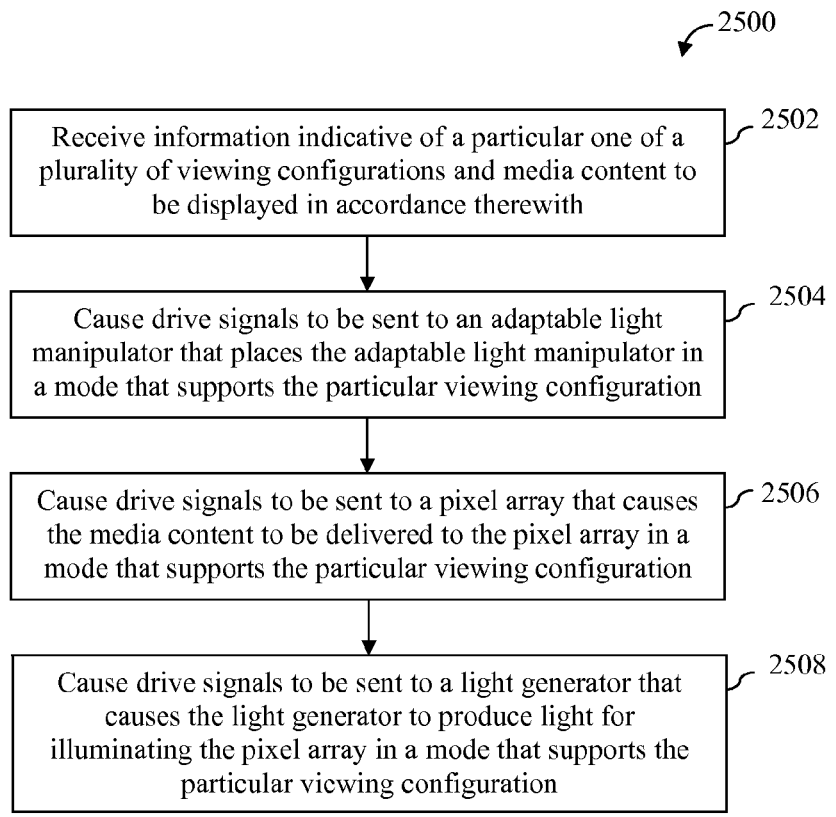

FIG. 25 depicts a flowchart of a method for providing coordinated control of an adaptable light manipulator, a pixel array and a light generator that together comprise an adaptable display system in accordance with an embodiment.

Figure 26:
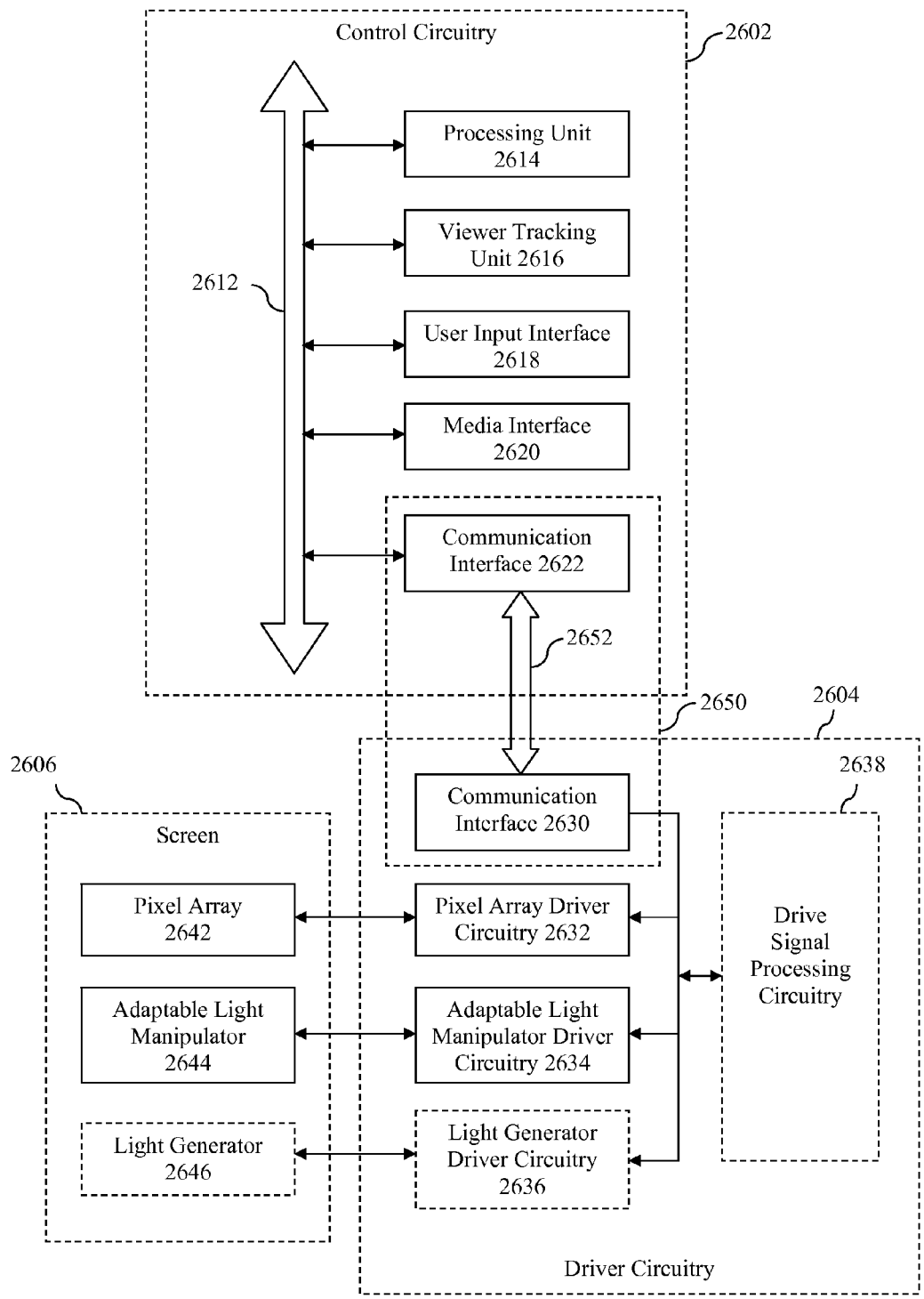

FIG. 26 is a block diagram of an example practical implementation of an adaptable two-dimensional/three-dimensional display system in accordance with an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Embodiments described herein provide systems and methods for driving an adaptable light manipulator and a pixel array in a coordinated fashion so as to achieve a desired viewing configuration of a two-dimensional/three-dimensional image display. The adaptable light manipulator may comprise, for example, an adaptable lenticular lens such as that described in commonly-owned, co-pending U.S. patent application Ser. No. 12/774,307, filed on May 5, 2010, and entitled "Display with Elastic Light Manipulator," the entirety of which is incorporated by reference herein, or an adaptable parallax barrier such as that described in commonly-owned co-pending U.S. patent application Ser. No. 12/845,440, filed on Jul. 28, 2010, and entitled "Adaptable Parallax Barrier Supporting Mixed 2D and Stereoscopic 3D Display Regions," the entirety of which is incorporated by reference herein. As described in those applications, the adaptable light manipulator can be dynamically modified in order to accommodate, for example, a changing viewer sweet spot or switching between two-dimensional images and three-dimensional images. As further described in commonly-owned, co-pending U.S. patent application Ser. No. 12/774,225, filed on May 5, 2010 and entitled "Controlling a Pixel Array to Support an Adaptable Light Manipulator," the entirety of which is incorporated by reference herein, the manner in which images are rendered to pixels of a pixel array used in conjunction with such an adaptable light manipulator may be coordinated with the state of the adaptable light manipulator to support a variety of viewing configurations. Embodiments described herein are directed to coordinated driving of both the adaptable light manipulator and the pixel array to achieve a desired viewing configuration.

Embodiments described herein also provide systems and methods for driving an adaptable light manipulator, a pixel array and a non-uniform light generator in a coordinated fashion so as to achieve a desired viewing configuration of a two-dimensional/three-dimensional image display. As described in the aforementioned, incorporated U.S. patent application Ser. No. 12/845,440, in a case of where the adaptable light manipulator is an adaptable parallax barrier, simultaneous presentation of two-dimensional and three-dimensional content via different regions of the same display is also enabled. This feature may be supported by a non-uniform light generator (such as a backlighting array) as described in commonly-owned, co-pending U.S. patent application Ser. No. 12/982,020, filed on even date herewith and entitled "Backlighting Array Supporting Adaptable Parallax Barrier", the entirety of which is incorporated by reference herein.

II. Exemplary Display Systems that Support Multiple Viewing Configurations

Before describing example systems and methods for coordinated driving of an adaptable light manipulator and pixel array, or an adaptable light manipulator, pixel array and non-uniform light generator, exemplary display systems will first be described that include such display elements to enable multiple two-dimensional and three-dimensional viewing configurations.

A. Example Display Systems Using Adaptable Parallax Barriers

Figure 1:
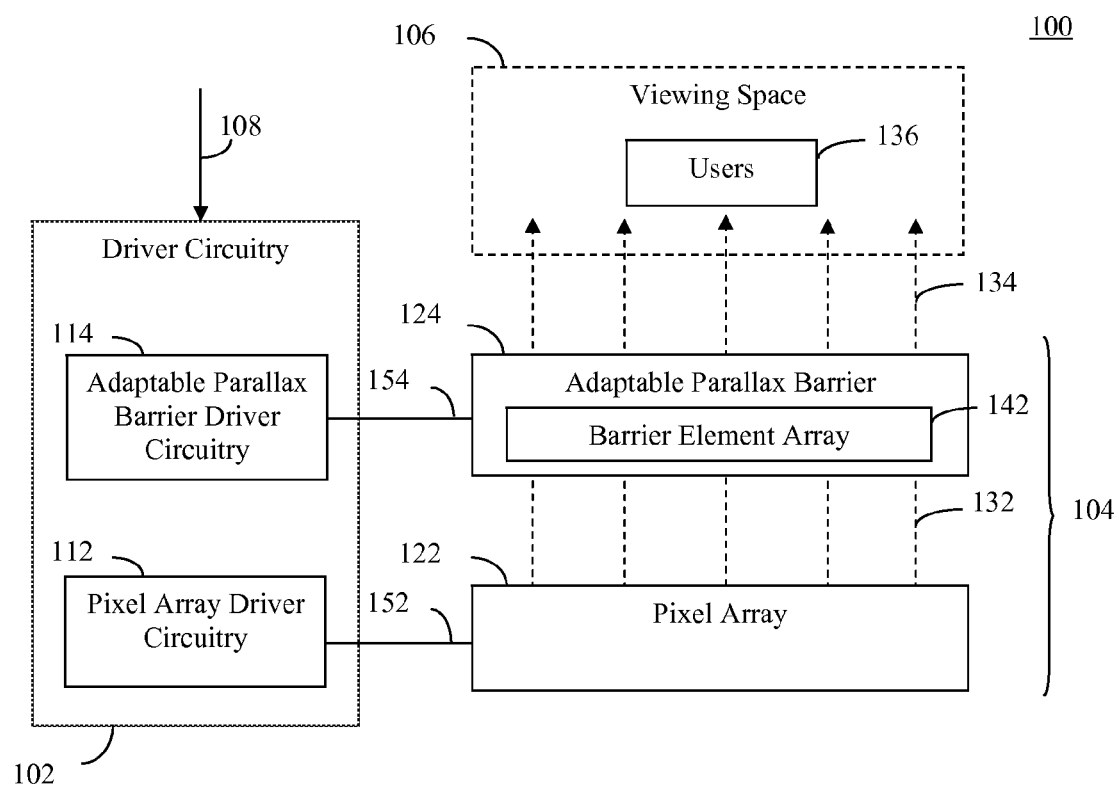
FIG. 1 is a block diagram of a display system in accordance with an embodiment that utilizes an adaptable parallax barrier to support multiple viewing configurations.

FIG. 1 is a block diagram of a display system 100 that utilizes an adaptable parallax barrier to support multiple viewing configurations in accordance with an embodiment. As shown in FIG. 1, display system 100 includes driver circuitry 102 and a screen 104, wherein screen 104 include a pixel array 122 and an adaptable parallax barrier 124. As further shown in FIG. 1, driver circuitry 104 includes pixel array driver circuitry 112 and adaptable parallax barrier driver circuitry 114.

Pixel array 122 comprises a two-dimensional array of pixels (e.g., arranged as a grid or other distribution). Pixel array 122 is a self-illuminating or light-generating pixel array such that the pixels of pixel array 122 each emit light included in light 132. Each pixel may be a separately addressable light source (e.g., a pixel of a plasma display, an LCD display, an LED display such as an OLED display, or of other type of display). Each pixel of pixel array 122 may be individually controllable to vary color and intensity. In an embodiment, each pixel of pixel array 122 may include a plurality of sub-pixels that correspond to separate color channels, such as a trio of red, green, and blue sub-pixels included in each pixel.

Adaptable parallax barrier 124 is positioned proximate to a surface of pixel array 122. Barrier element array 142 is a layer of adaptable parallax barrier 124 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 142 may be configured such that light 132 emanating from pixel array 122 is filtered to produce filtered light 134, wherein filtered light 134 includes one or more two-dimensional and/or three-dimensional images that may be viewed by users 136 in a viewing space 106.

Depending upon the implementation, each barrier element may have a round, square, or rectangular shape, and barrier element array 142 may have any number of rows of barrier elements that extend a vertical length of barrier element array 142. In another embodiment, each barrier element may have a "band" shape that extends a vertical length of barrier element array 142, such that barrier element array 142 includes a single horizontal row of barrier elements. Each barrier element may include one or more of such bands, and different regions of barrier element array 142 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 102 receives control signals 108 from control circuitry (not shown in FIG. 1). The control signals 108 cause driver circuitry 102 to place screen 104 in a selected one of a plurality of different viewing configurations. In particular, based on control signals 108, adaptable parallax barrier driver circuitry 114 transmits drive signals 154 that cause barrier element array 142 to be placed in a state that supports the selected viewing configuration. The selected viewing configuration may be a particular two-dimensional viewing configuration, a particular three-dimensional viewing configuration, or a viewing configuration that supports the display of different types of two-dimensional and/or three-dimensional content in corresponding display regions.

Figure 2:
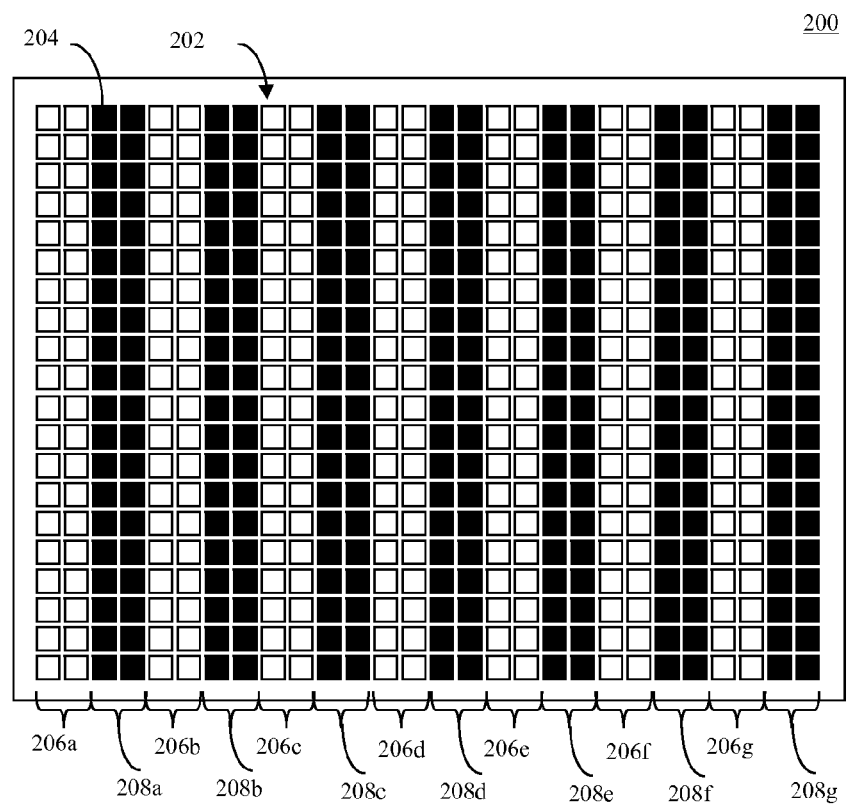
FIG. 2 illustrates an arrangement of an adaptable parallax barrier in accordance with an embodiment that supports a particular three-dimensional viewing configuration.

For example, FIG. 2 shows an arrangement of an adaptable parallax barrier 200 that supports a particular three-dimensional viewing configuration. Adaptable parallax barrier 200 is an example of adaptable parallax barrier 124 of FIG. 1. As shown in FIG. 2, adaptable parallax barrier 200 includes a barrier element array 202, which includes a plurality of barrier elements 204 arranged in a two-dimensional array. Furthermore, as shown in FIG. 2, barrier element array 202 includes a plurality of parallel strips of barrier elements 204 that are selected to be non-blocking to form a plurality of parallel non-blocking strips (or "slits") 206a-206g. As shown in FIG. 2, parallel non-blocking strips 206a-206g (non-blocking slits) are alternated with parallel blocking strips 208a-208g of barrier elements 204 that are selected to be blocking. In the example of FIG. 2, non-blocking strips 206a-206g and blocking strips 208a-208g each have a width (along the x-dimension) of two barrier elements 204, and have lengths that extend along the entire y-dimension (twenty barrier elements 204) of barrier element array 202, although in other embodiments, may have alternative dimensions. Non-blocking strips 206a-206g and blocking strips 208a-208g form a parallax barrier configuration for adaptable parallax barrier 200. The spacing (and number) of parallel non-blocking strips 206 in barrier element array 202 may be selectable by choosing any number and combination of particular strips of barrier elements 204 in barrier element array 202 to be non-blocking, to be alternated with blocking strips 208, as desired. For example, hundreds, thousands, or even larger numbers of non-blocking strips 206 and blocking strips 208 may be present in adaptable parallax barrier 200.

Figure 3:
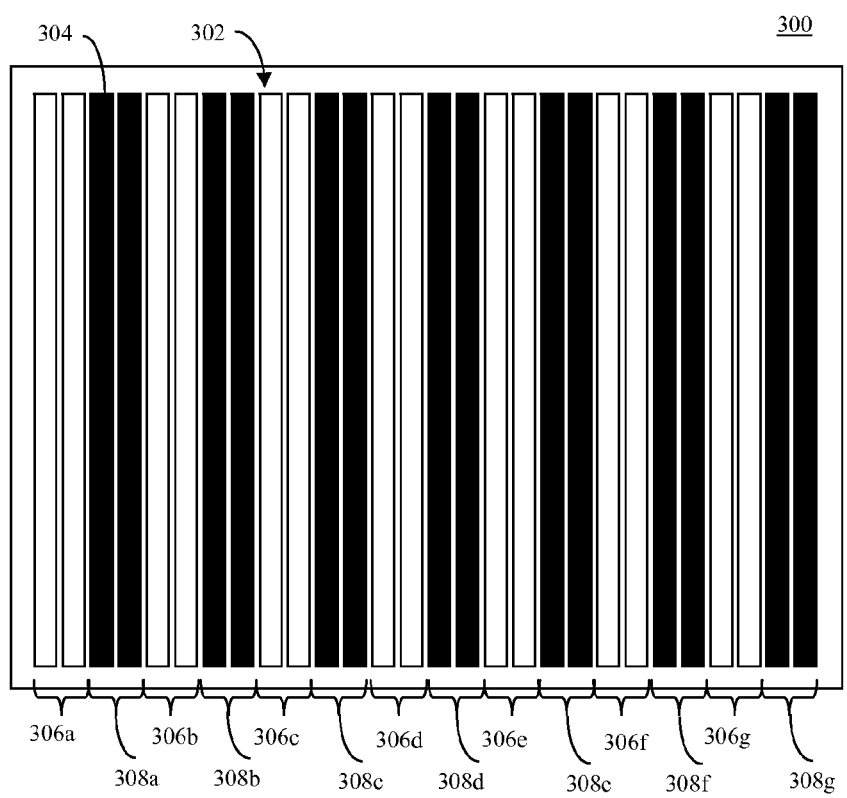
FIG. 3 illustrates an arrangement of an adaptable parallax barrier in accordance with an alternate embodiment that supports a particular three-dimensional viewing configuration.

FIG. 3 shows an alternative example of an adaptable parallax barrier 300 that has also been configured to support a particular three-dimensional viewing configuration. Similarly to adaptable parallax barrier 200 of FIG. 2, adaptable parallax barrier 300 includes a barrier element array 302, which includes a plurality of barrier elements 304 arranged in a two-dimensional array (28×1 array). Barrier elements 304 have widths (along the x-dimension) similar to the widths of barrier elements 204 in FIG. 2, but have lengths that extend along the entire vertical length (y-dimension) of barrier element array 302. As shown in FIG. 3, barrier element array 302 includes parallel non-blocking strips 306a-306g alternated with parallel blocking strips 308a-308g. In the example of FIG. 3, parallel non-blocking strips 306a-306g and parallel blocking strips 308a-308g each have a width (along the x-dimension) of two barrier elements 304, and have lengths that extend along the entire y-dimension (one barrier element 304) of barrier element array 302.

Each of adaptable parallax barriers 200 and 300, configured in the manner shown in FIGS. 2 and 3 respectively, filter light produced by a pixel array to form one or more three-dimensional views in a viewing space, thus supporting a three-dimensional viewing configuration. To achieve a two-dimensional viewing configuration, all of the barrier elements of either adaptable parallax barrier 200 or 300 can simply be placed in a non-blocking state. Additional details concerning how the adaptable parallax barriers operate to support such three-dimensional viewing may be found, for example, in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions."

In the adaptable parallax barrier configurations shown in FIGS. 2 and 3, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 4:
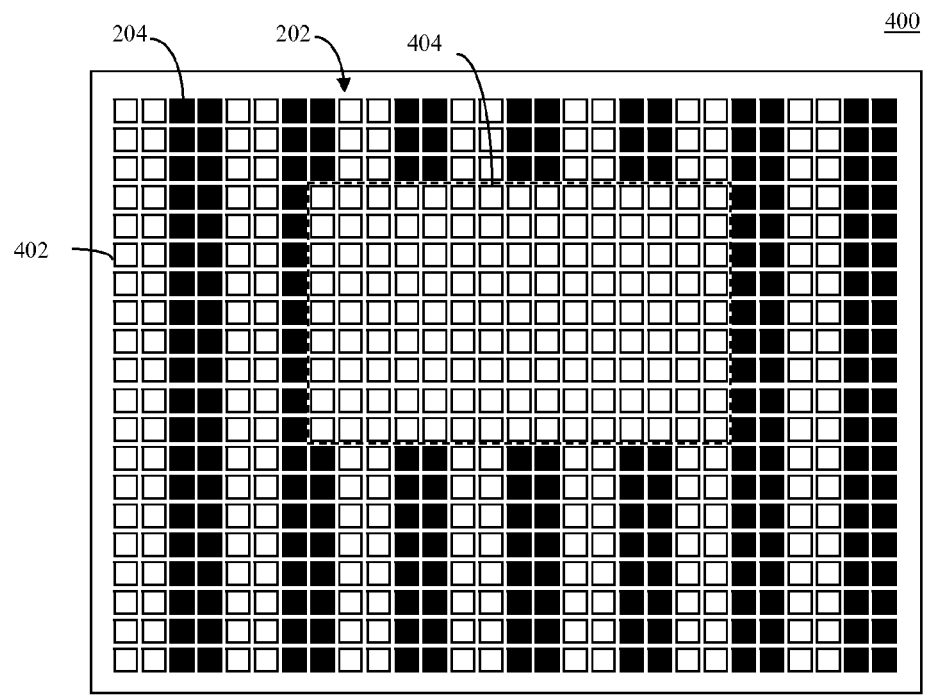
FIG. 4 illustrates an arrangement of an adaptable parallax barrier in accordance with an embodiment that supports a viewing configuration that mixes two-dimensional and three-dimensional viewing regions.

For instance, FIG. 4 shows an arrangement of an adaptable parallax barrier 400 that supports a viewing configuration that mixes two-dimensional and three-dimensional viewing regions according to example embodiments. Adaptable parallax barrier 400 is similar to adaptable parallax barrier 200 of FIG. 2, having barrier element array 202 including a plurality of barrier elements 204 arranged in a two-dimensional array. In FIG. 4, a first region 402 of barrier element array 202 includes a plurality of parallel non-blocking strips alternated with parallel blocking strips that together fill first region 402. A second region 404 of barrier element array 202 is surrounded by first region 402. Second region 404 is a rectangular shaped region of barrier element array 202 that includes a two-dimensional array of barrier elements 204 that are non-blocking. Thus, in FIG. 4, barrier element array 202 is configured to enable a three-dimensional image to be generated by pixels of a pixel array that are adjacent to barrier elements of first region 402, and to enable a two-dimensional image to be generated by pixels of the pixel array that are adjacent to barrier elements inside of second region 404. Note that alternatively, first region 402 may include all non-blocking barrier elements 202 to pass a two-dimensional image, and second region 404 may include parallel non-blocking strips alternated with parallel blocking strips to pass a three-dimensional image. In further embodiments, adaptable parallax barrier 400 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 5:
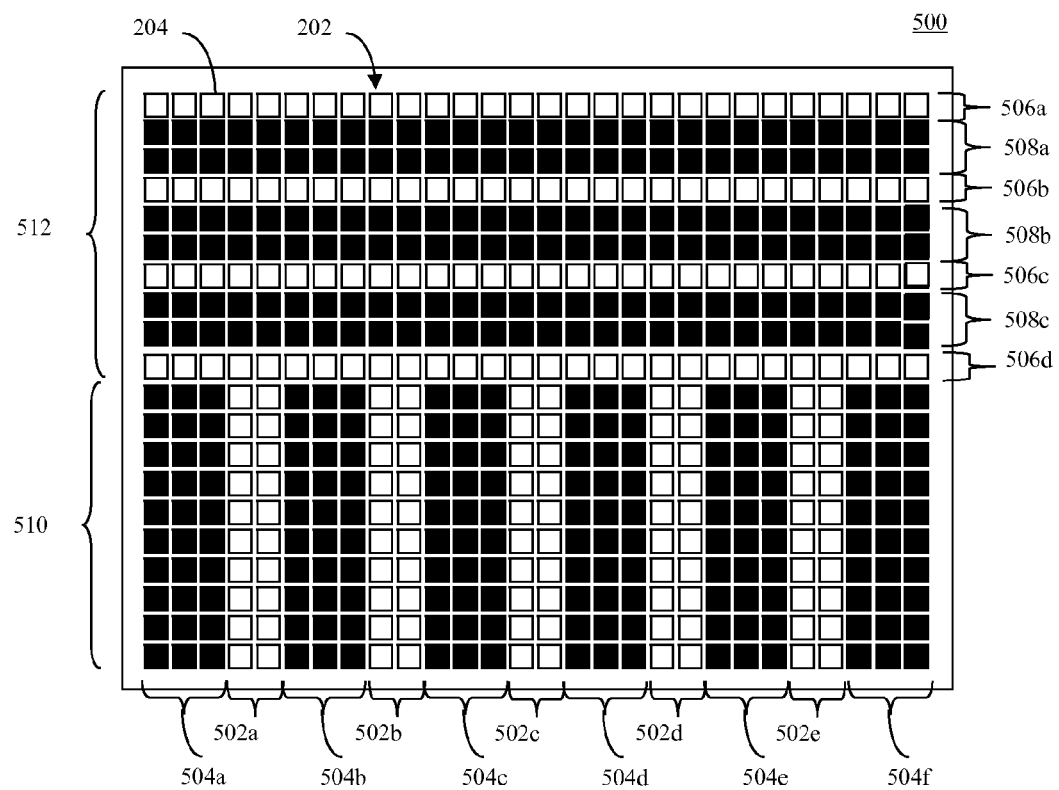
FIG. 5 illustrates an arrangement of an adaptable parallax barrier in accordance with an embodiment in which different orientations of transparent and opaque slits are used to simultaneously support different viewer orientations.

For example, FIG. 5 shows an arrangement of an adaptable parallax barrier 500 in which transparent slits have different orientations, according to an example embodiment. Adaptable parallax barrier 500 is similar to adaptable parallax barrier 200 of FIG. 2, having barrier element array 202 including a plurality of barrier elements 204 arranged in a two-dimensional array. A first region 510 (e.g., a bottom half) of barrier element array 202 includes a first plurality of parallel strips of barrier elements 204 that are selected to be non-blocking to form a first plurality of parallel non-blocking strips 502a-502e (each having a width of two barrier elements 204). As shown in FIG. 5, parallel non-blocking strips 502a-502e are alternated with parallel blocking strips 504a-504f of barrier elements 204 (each having a width of three barrier elements 204). Parallel non-blocking strips 502a-502e are oriented in a first direction (e.g., along a vertical axis).

Furthermore, as shown in FIG. 5, a second region 512 (e.g., a top half) of barrier element array 202 includes a second plurality of parallel strips of barrier elements 204 that are selected to be non-blocking to form a second plurality of parallel non-blocking strips 506a-506d (each having a width of one barrier element 204). As shown in FIG. 5, parallel non-blocking strips 506a-506d are alternated with parallel blocking strips 508a-508c of barrier elements 204 (each having a width of two barrier elements 204). Parallel non-blocking strips 506a-506d are oriented in a second direction (e.g., along a horizontal axis).

As such, in FIG. 5, first and second pluralities of parallel non-blocking strips 502a-502e and 506a-506d are present in barrier element array 202 that are oriented perpendicularly to each other. The region of barrier element array 202 that includes first plurality of parallel non-blocking strips 502a-502e may be configured to deliver a three-dimensional image in a viewing space to be viewable by a user whose body is oriented vertically (e.g., sitting upright or standing up). The region of barrier element array 202 that includes second plurality of parallel non-blocking strips 506a-506d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

The foregoing adaptable parallax barriers and arrangements thereof have been described herein by way of example only. Additional adaptable parallax barriers and arrangements thereof may be used to support additional viewing configurations. For example, additional adaptable parallax barrier implementations and arrangements thereof are described in the aforementioned, incorporated U.S. patent application Ser. No. 12/845,440 filed on Jul. 28, 2010, and entitled "Adaptable Parallax Barrier Supporting Mixed 2D and Stereoscopic 3D Display Regions," and in commonly-owned, co-pending U.S. patent application Ser. No. 12/845,461, filed on Jul. 28, 2010, and entitled "Display Supporting Multiple Simultaneous 3D Views," the entirety of which is incorporated by reference herein.

Returning now to the description of display system 100 of FIG. 1, since a configuration of adaptable parallax barrier 124 can be dynamically modified to support a particular viewing configuration, pixel array 122 must also be controlled to support the same viewing configuration. In particular, the rendering of pixels of an image (also referred to herein as "image pixels") among the pixels of pixel array 122 (also referred to herein as "display pixels") must be handled in a manner that is consistent with a current configuration of adaptable parallax barrier 124. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 124. Such changes may be implemented by a controller (not shown in FIG. 1) via delivery of appropriate control signals 108 to pixel array driver circuitry 112.

For example, in one embodiment, when a configuration of adaptable parallax barrier 124 supports a first viewing configuration responsive to control signals 108, pixel array driver circuitry 204 sends drive signals 152 in conformance with control signals 108 such that the rendering of images to pixel array 122 occurs in a manner that also supports the first viewing configuration. Furthermore, when the configuration of adaptable parallax barrier 124 is modified to support a second viewing configuration responsive to control signals 108, pixel array driver circuitry 204 sends drive signals 152 in conformance with the control signals 108 such that the rendering of images to pixel array 122 occurs in a manner that also supports the second viewing configuration.

Figure 6:
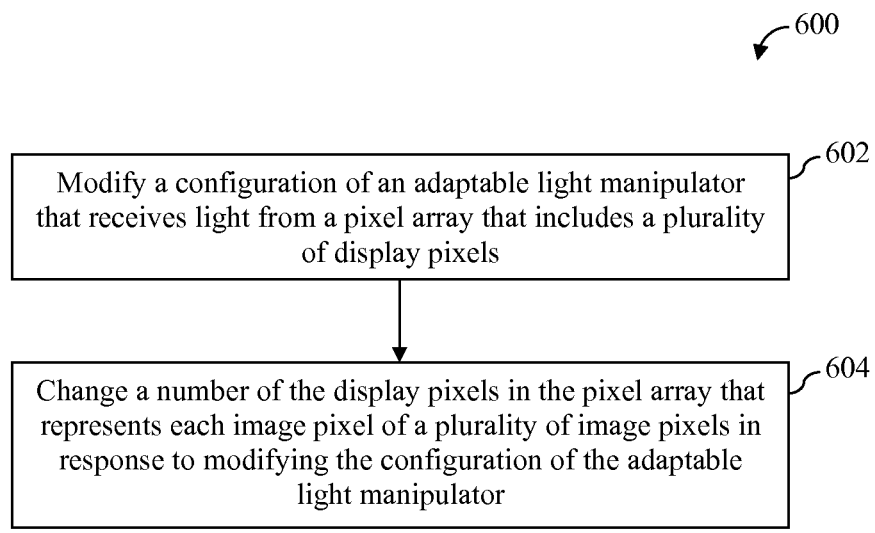
FIG. 6 depicts a flowchart of a method for controlling a pixel array to support a same viewing configuration as an adaptable light manipulator in accordance with an embodiment.

FIG. 6 depicts a flowchart 600 of an example method for controlling a pixel array to support the same viewing configuration as an adaptable light manipulator (such as adaptable parallax barrier 124) in accordance with an embodiment. As shown in FIG. 6, the method of flowchart 600 begins at step 602. During step 602, a configuration of an adaptable light manipulator, such as adaptable parallax barrier 124, is modified. At step 604, a number of display pixels in a pixel array, such as pixel array 122, that represents each image pixel of a plurality of image pixels is changed in response to modifying the configuration of the adaptable light manipulator.

Figure 8:
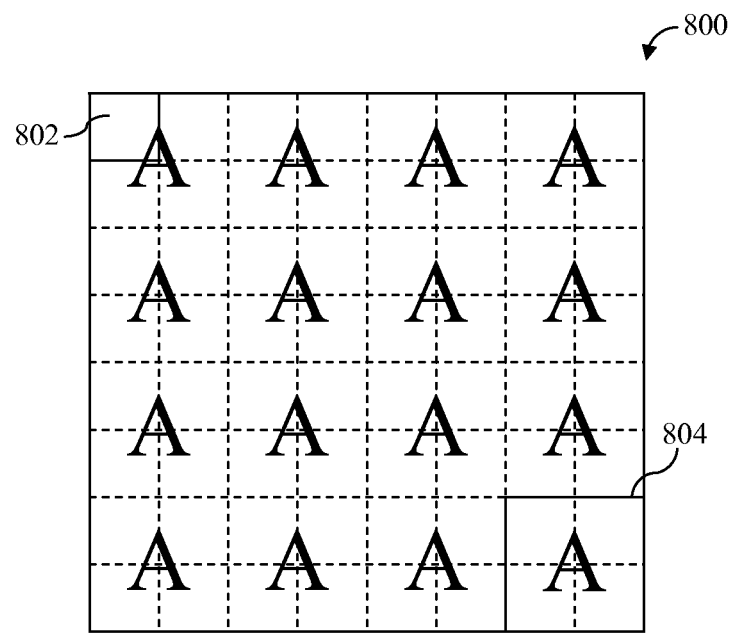
FIG. 8 illustrates a portion of a pixel array to which image pixels have been mapped to support a two-dimensional viewing configuration of an adaptable light manipulator in accordance with an embodiment.
Figure 9:
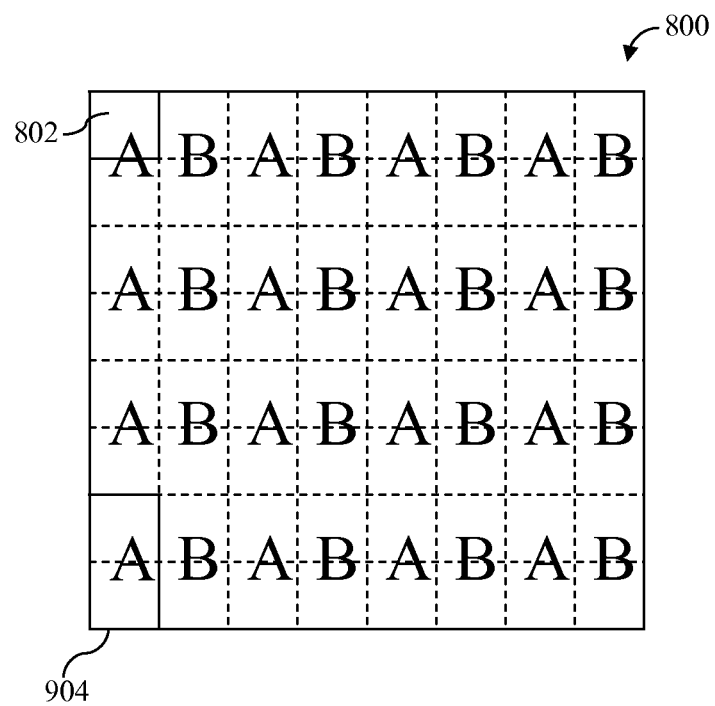
FIG. 9 illustrates how image pixels are mapped to the portion of the pixel array shown in FIG. 8 to support a first three-dimensional viewing configuration of an adaptable light manipulator in accordance with an embodiment.

FIGS. 8 and 9 provide a simple illustration of an application of the method of flowchart 600. As shown in FIG. 8, a portion of a pixel array 800 includes a 16×16 array of display pixels. An example display pixel is shown as display pixel 802. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 804. In FIG. 8, the first image is intended to represent an image that is viewed when an adaptable light manipulator disposed proximate to the pixel array is configured to support a two-dimensional viewing configuration.

FIG. 9 is intended to represent the same portion of pixel array 800 after the configuration of the adaptable light manipulator has been changed to support a three-dimensional viewing configuration. The three-dimensional viewing configuration requires the combined display of a first image and a second image across the same portion of pixel array 800. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 7:
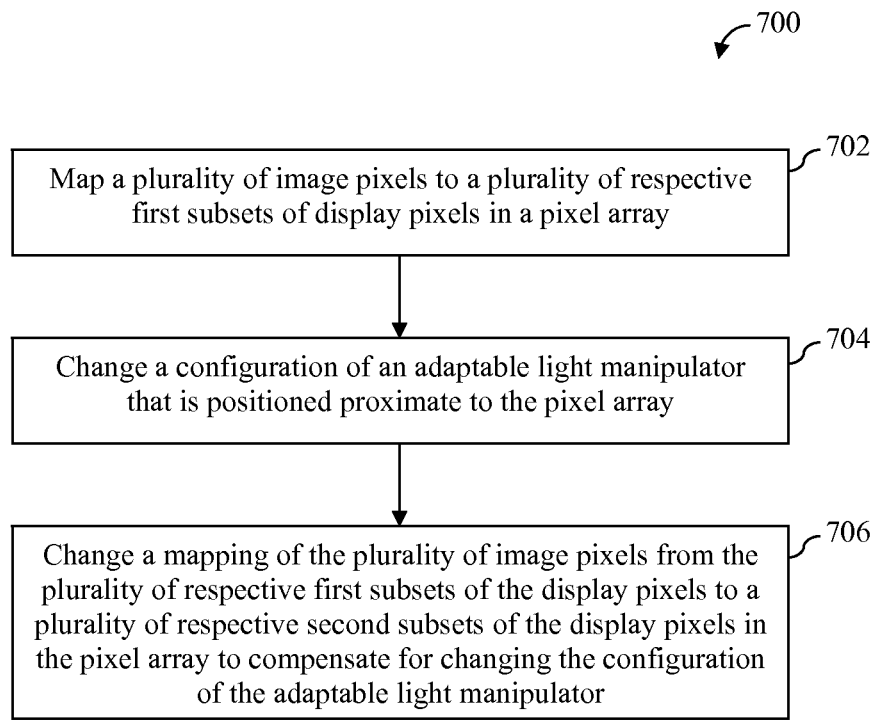
FIG. 7 depicts a flowchart of an alternate example method for controlling a pixel array to support a same viewing configuration as an adaptable light manipulator in accordance with an embodiment.

FIG. 7 depicts a flowchart 700 of another example method for controlling a pixel array to support the same viewing configuration as an adaptable light manipulator (such as adaptable parallax barrier 124) in accordance with an embodiment. As shown in FIG. 7, the method of flowchart 700 begins at step 702. During step 702, a plurality of image pixels is mapped to a plurality of respective first subsets of display pixels in a pixel array, such as pixel array 122. At step 704, a configuration of an adaptable light manipulator that is positioned proximate to the pixel array is changed. For example, in an embodiment in which the adaptable light manipulator includes adaptable parallax barrier 124, a slit pattern, orientation, or the like, of adaptable parallax barrier 124 may be changed. At step 706, a mapping of the plurality of image pixels is changed from the plurality of respective first subsets of the display pixels to a plurality of respective second subsets of the display pixels in the pixel array to compensate for changing the configuration of the adaptable light manipulator.

Figure 10:
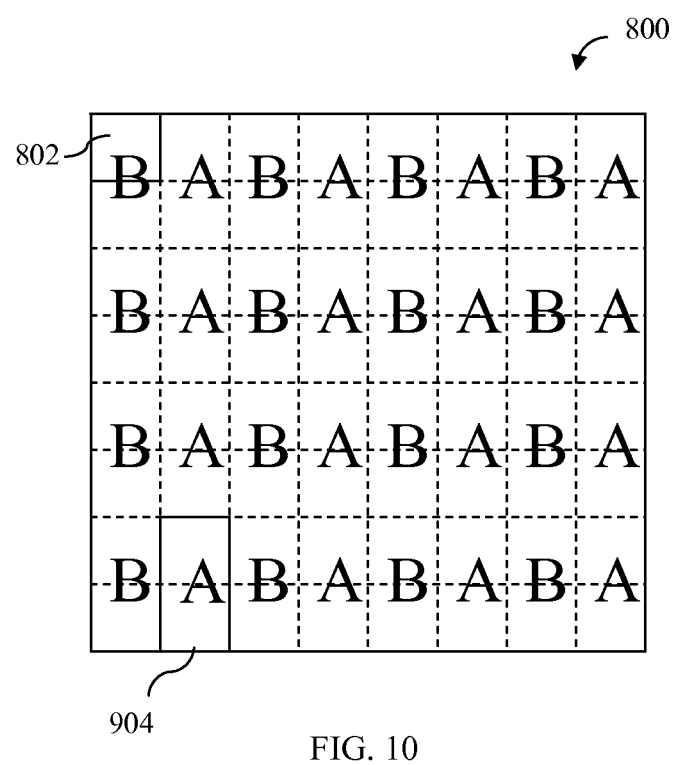
FIG. 10 illustrates how image pixels are mapped to the portion of the pixel array shown in FIGS. 8 and 9 to support a second three-dimensional viewing configuration of an adaptable light manipulator in accordance with an embodiment.

FIGS. 9 and 10 provide a simple illustration of an application of the method of flowchart 700. As shown in FIG. 9, a portion of a pixel array 800 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 10 is intended to represent the same portion of pixel array 800 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 10. Thus, for example, rather than rendering image pixel 904 to the bottom-most two display pixels in the far-left column of array portion 800, the same image pixel 904 is now rendered to the bottom-most two display pixels in the second column from the left of array portion 800.

Numerous other methods may be used to control the rendering of image pixels to display pixels in support of a desired two-dimensional and/or three-dimensional viewing configuration implemented by an adaptable parallax barrier or other adaptable light manipulator. Additional details concerning such control of a pixel array may be found in the aforementioned, incorporated U.S. patent application Ser. No. 12/774,225, filed on May 5, 2010, and entitled "Controlling a Pixel Array to Support an Adaptable Light Manipulator."

Figure 11:
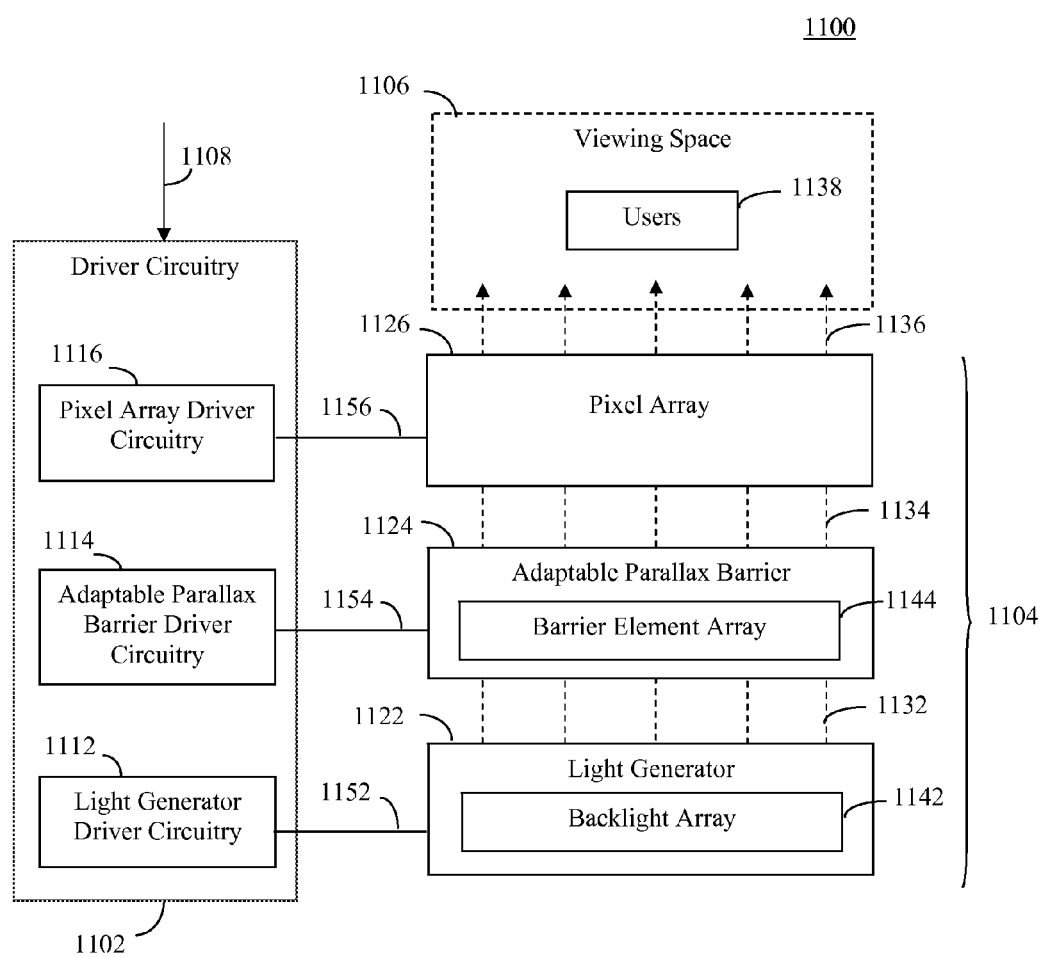
FIG. 11 is a block diagram of an example display system that utilizes an adaptable parallax barrier and a light generator to support multiple viewing configurations in accordance with an embodiment.

FIG. 11 shows a block diagram of an example display system 1100, which is another example of a display system that utilizes an adaptable parallax barrier to support multiple viewing configurations. As shown in FIG. 11, display system 1100 includes driver circuitry 1102 and a screen 1104, wherein screen 1104 include a light generator 1122, an adaptable parallax barrier 1124 and a pixel array 1126. As further shown in FIG. 11, driver circuitry 1102 includes light generator driver circuitry 1112, adaptable parallax barrier driver circuitry 1114 and pixel array driver circuitry 1116.

Light generator 1122 emits light 1132. Adaptable parallax barrier 1124 is positioned proximate to light generator 1122. Barrier element array 1144 is a layer of adaptable parallax barrier 1124 that includes a plurality of barrier elements or blocking regions arranged in an array. Each barrier element of the array is configured to be selectively opaque or transparent. Barrier element array 1144 filters light 1132 received from light generator 1122 to generate filtered light 1134. Filtered light 1134 is configured to enable a two-dimensional image or a three-dimensional image (e.g., formed by a pair of two-dimensional images in filtered light 1134) to be formed based on images subsequently imposed on filtered light 1134 by pixel array 1126.

Pixel array 1126 includes a two-dimensional array of pixels (e.g., arranged in a grid or other distribution) like pixel array 122 of FIG. 1. However, pixel array 1126 is not self-illuminating, and instead is a light filter that imposes images (e.g., in the form of color, grayscale, etc.) on filtered light 1134 from adaptable parallax barrier 1124 to generate filtered light 1136 to include one or more images. Each pixel of pixel array 1126 may be a separately addressable filter (e.g., a pixel of a plasma display, an LCD display, an LED display, or of other type of display). Each pixel of pixel array 1126 may be individually controllable to vary the color imposed on the corresponding light passing through, and/or to vary the intensity of the passed light in filtered light 1136. In an embodiment, each pixel of pixel array 1126 may include a plurality of sub-pixels that correspond to separate color channels, such as a trio of red, green, and blue sub-pixels included in each pixel.

Driver circuitry 1102 receives control signals 1108 from control circuitry (not shown in FIG. 11). The control signals 1108 cause driver circuitry 1102 to place screen 1104 in a selected one of a plurality of different viewing configurations. In particular, based on control signals 1108, adaptable parallax barrier driver circuitry 1114 transmits drive signals 1154 that cause barrier element array 1144 to be placed in a state that supports the selected viewing configuration. Likewise, based on control signals 1108, pixel array driver circuitry 1116 transmits drive signals 1156 to cause pixels of one or more images (also referred to herein as "image pixels") to be rendered among the pixels of pixel array 1126 (also referred to herein as "display pixels") in a manner that is consistent with a current configuration of adaptable parallax barrier 1124. The selected viewing configuration may be a particular two-dimensional viewing configuration, a particular three-dimensional viewing configuration, or a viewing configuration that supports the display of different types of two-dimensional and/or three-dimensional content in different display regions.

As discussed in the aforementioned, incorporated U.S. patent application Ser. No. 12/982,020, filed on even date herewith and entitled "Backlighting Array Supporting Adaptable Parallax Barrier," conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions," the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 1122 includes a backlight array 1142 which is a two-dimensional array of light sources. Such light sources may be arranged, for example, in a rectangular grid. Each light source in backlight array 1142 is individually addressable and controllable to select an amount of light emitted thereby. A single light source may comprise one or more light-emitting elements depending upon the implementation. In one embodiment, each light source in backlight array 1142 comprises a single light-emitting diode (LED) although this example is not intended to be limiting.

The amount of light emitted by the individual light sources that make up backlight array 1142 can selectively controlled by drive signals 1152 generated by light generator driver circuitry 1112 so that the brightness associated with each of a plurality of display regions of screen 1104 can also be controlled. This enables display system 1100 to provide a desired brightness level for each display region automatically and/or in response to user input. For example, backlight array 1142 can be controlled such that a uniform level of brightness is achieved across different simultaneously-displayed display regions, even though the number of perceptible pixels per unit area varies from display region to display region. As another example, backlight array 1142 can be controlled such that the level of brightness associated with a particular display region is increased or reduced without impacting (or without substantially impacting) the brightness of other simultaneously-displayed display regions.

To help illustrate this, FIG. 12 provides an exploded view of a display system 1200 that implements a controllable backlight array as described immediately above. Display system 1200 comprises one implementation of display system 1100. As shown in FIG. 12, display system 1200 includes a light generator 1202 that includes a backlight array 1212, an adaptable parallax barrier 1204 that includes a barrier element array 1222 and a display panel 1206 that includes a pixel array 1232. These elements may be aligned with and positioned proximate to each other to create an integrated display screen.

In accordance with the example configuration shown in FIG. 12, a first portion 1234 of pixel array 1232 and a first portion 1224 of barrier element array 1222 have been manipulated to create a first display region that displays multi-view three-dimensional content, a second portion 1236 of pixel array 1232 and a second portion 1226 of barrier element array 1222 have been manipulated to create a second display region that displays a three-dimensional image, and a third portion of 1238 of pixel array 1232 and a third portion 1228 of barrier element array 1222 have been manipulated to create a third display region that displays a two-dimensional image. To independently control the brightness of each of the first, second and third display regions, the amount of light emitted by light sources included within a first portion 1214, a second portion 1216 and a third portion 1218 of backlight array 1212 can respectively be controlled. For example, the light sources within first portion 1214 may be controlled to provide greater luminosity than the light sources within second portion 1216 and third portion 1218 as the number of perceivable pixels per unit area will be smallest in the first display region with which first portion 1214 is aligned. In further accordance with this example, the light sources within second portion 1216 may be controlled to provide greater luminosity than the light sources within third portion 1218 since the number of perceivable pixels per unit area will be smaller in the second display region with which second portion 1216 is aligned than the third display region with which third portion 1218 is aligned. Of course, if uniform luminosity is not desired across the various display regions then other control schemes may be used.

Of course, the arrangement shown in FIG. 12 provides only a single teaching example. It should be noted that a display system in accordance with an embodiment can dynamically manipulate pixel array 1232 and barrier element array 1222 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1212 can also be dynamically manipulated in a coordinated fashion with pixel array 1232 and barrier element array 1222 to ensure that each display region is perceived at a desired level of brightness.

In the arrangement shown in FIG. 12, there is a one-to-one correspondence between each light source in backlight array 1212 and every display pixel in pixel array 1232. However, this need not be the case to achieve regional brightness control. For example, in certain embodiments, the number of light sources provided in backlight array 1212 is less than the number of pixels provided in pixel array 1232. For instance, in one embodiment, a single light source may be provided in backlight array 1212 for every N pixels provided in pixel array 1232, wherein N is an integer greater than 1. In an embodiment in which the number of light sources in backlight array 1212 is less than the number of pixels in pixel array 1232, each light source may be arranged so that it provides backlighting for a particular group of pixels in pixel array 1232, although this is only an example. In alternate embodiments, the number of light sources provided in backlight array 1212 is greater than the number of pixels provided in pixel array 1232.

Also, in the examples described above, light sources in backlight array 1212 are described as being individually controllable. However, in alternate embodiments, light sources in backlight array 1212 may only be controllable in groups. This may facilitate a reduction in the complexity of the control infrastructure associated with backlight array 1212. In still further embodiments, light sources in backlight array 1212 may be controllable both individually and in groups.

It is also noted that although FIGS. 11 and 12 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 13. In particular, FIG. 13 is a block diagram of a display system 1300 that includes a pixel array 1324 disposed between a light generator 1322 that includes a backlight array 1342 and an adaptable parallax barrier 1326 that includes a barrier element array 1344 to support the generation of two-dimensional and/or three-dimensional images perceivable in a viewing space 1306. In such alternate implementations, selective control of the luminosity of groups or individual ones of the light sources in backlight array 1342 may also be used to vary the backlighting luminosity associated with different display regions created by the interaction of backlight array 1342, pixel array 1324 and barrier element array 1344.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 14 provides an exploded view of a display system 1400 that implements a regional brightness control scheme based on pixel intensity as described immediately above. As shown in FIG. 14, display system 1400 includes a display panel 1402 and an adaptable parallax barrier 1404. Display system 1400 also includes a backlight panel, although this element is not shown in FIG. 14. These elements may be aligned with and positioned proximate to each other to create an integrated display screen.

As further shown in FIG. 14, display panel 1402 includes a pixel array 1412. Each of the pixels in a first portion 1414 of pixel array 1412 is individually controlled by pixel array driver circuitry to pass a selected amount of light produced by a backlight panel (not shown in FIG. 14), thereby producing display-generated light representative of a single two-dimensional image. Each of the pixels in a second portion 1416 of pixel array 1412 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 1400, will be perceived as a single three-dimensional image.

Adaptable parallax barrier 1404 includes barrier element array 1422 that includes a first portion 1424 and a second portion 1426. Barrier element array 1422 is aligned with pixel array 1414 such that first portion 1424 of blocking region array 1422 overlays first portion 1414 of pixel array 1412 and second portion 1426 of blocking region array 1422 overlays second portion 1416 of pixel array 1412. Adaptable parallax barrier driver circuitry causes all the barrier elements within first portion 1424 of barrier element array 1422 to be transparent. Thus, the two-dimensional image generated by the pixels of first portion 1414 of pixel array 1412 will simply be passed through to a viewer in a viewing space in front of display system 1400. Furthermore, the adaptable parallax barrier driver circuitry manipulates the barrier elements within second portion 1426 of blocking region array 1422 to form a plurality of parallel transparent strips alternated with parallel opaque strips, thereby creating a parallax effect that enables the two two-dimensional images generated by the pixels of second portion 1416 of pixel array 1412 to be perceived as a three-dimensional image by a viewer in the viewing space in front of display system 1400.

Assume that a viewer is positioned such that he/she can perceive both the two-dimensional image passed by first portion 1424 of barrier element array 1422 and the three-dimensional image formed through parallax by second portion 1426 of barrier element 1422. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 1412.

To address this issue, drive signals may be transmitted to display panel 1402 that selectively cause the pixels included in first portion 1414 of pixel array 1412 to pass less light from the backlight panel (i.e., become less intense), thereby reducing the brightness of the two-dimensional image produced from the pixels in first portion 1414 of pixel array 1412. Alternatively or additionally, drive signals may be transmitted to display panel 1402 that selectively cause the pixels included in second portion 1416 of pixel array 1412 to pass more light from the backlight panel (i.e., become more intense), thereby increasing the brightness of the three-dimensional image produced from the pixels in second portion 1416 of pixel array 1412. By controlling the intensity of the pixels in portions 1414 and 1416 of pixel array 1412 in this manner, the brightness of the two-dimensional image produced from the pixels in first portion 1414 of pixel array 1412 and the brightness of the three-dimensional image produced from the pixels in second portion 1416 of pixel array 1412 can be kept consistent. Additionally, by providing independent control over the intensity of the pixels in portions 1414 and 1416 of pixel array 1412, independent control over the brightness of the two-dimensional and three-dimensional images generated therefrom can also be achieved.

Of course, the arrangement shown in FIG. 14 provides only a single teaching example. It should be noted that a display system in accordance with an embodiment can dynamically manipulate pixel array 1412 and blocking element array 1422 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 1412 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 15. FIG. 15 illustrates a front perspective view of a display panel 1500. Display panel 1500 includes a pixel array 1502 that includes a first portion 1504 and a second portion 1506, wherein each of first portion 1504 and second portion 1506 includes a different subset of the pixels in pixel array 1502. It is to be assumed that first portion 1504 of pixel array 1502 is illuminated by backlighting provided by an aligned first portion of a backlight array (not shown in FIG. 15), wherein the backlight array is similar to backlight array 1142 described above in reference to FIG. 11. Second portion 1506 of pixel array 1502 is illuminated by backlighting provided by an aligned second portion of the backlight array. In one example the amount of light emitted by each light source in the second portion of the backlight array to illuminate second portion 1506 of pixel array 1502 is controlled such that it is greater than the amount of light emitted by each light source in the first portion of the backlight array to illuminate first portion 1504 of pixel array 1502. This control scheme may be applied, for example, to cause a three-dimensional image formed by interaction between the pixels in second portion 1506 of pixel array 1502 and an adaptable parallax barrier to appear to have a uniform brightness level with respect to a two-dimensional image formed by interaction between the pixels in first portion 1504 of pixel array 1504 and the adaptable parallax barrier.

However, the difference in the amount of light emitted by each light source in the first and second portions of the backlight array to illuminate corresponding first and second portions 1504 and 1506 of pixel array 1502 may also give rise to undesired visual artifacts. In particular, the difference may cause pixels in boundary areas immediately outside of second portion 1506 of pixel array 1502 to appear brighter than desired in relation to other pixels in first portion 1504 of pixel array 1502. For example, as shown in FIG. 15, the pixels in boundary area 1512 immediately outside of second portion 1506 of pixel array 1502 may appear brighter than desired in relation to other pixels in first portion 1504 of pixel array 1502. This may be due to the fact that the increased luminosity provided by the light sources in the second portion of the backlight array has "spilled over" to impact the pixels in boundary area 1512, causing those pixels to be brighter than desired. Conversely, the difference may cause pixels in boundary areas immediately inside of second portion 1506 of pixel array 1502 to appear dimmer than desired in relation to other pixels in second portion 1506 of pixel array 1502. For example, as shown in FIG. 15, the pixels in boundary area 1514 immediately inside of second portion 1506 of pixel array 1502 may appear dimmer than desired in relation to other pixels in second portion 1506 of pixel array 1502. This may be due to the fact that the reduced luminosity of the light sources in the first portion of the backlight array has "spilled over" to impact the pixels in boundary area 1514, causing those pixels to be dimmer than desired.

To address this issue, an embodiment may selectively control the amount of light passed by the pixels located in boundary region 1512 or boundary region 1514 to compensate for the undesired visual effects. For example, driver circuitry associated with pixel array 1502 may selectively cause the pixels included in boundary area 1512 of pixel array 1502 to pass less light from the backlight panel (i.e., become less intense), thereby reducing the brightness of the pixels in boundary area 1512, thus compensating for an undesired increase in brightness due to "spill over" from light sources in the second portion of the backlight array. Alternatively or additionally, driver circuitry associated with pixel array 1502 may selectively cause the pixels included in boundary area 1514 of pixel array 1502 to pass more light from the backlight panel (i.e., become more intense), thereby increasing the brightness of the pixels in boundary area 1514, thus compensating for an undesired reduction in brightness due to "spill over" from light sources in the first portion of the backlight array. By controlling the intensity of the pixels in boundary areas 1512 and 1514 in this manner, the undesired visual effects described above that can arise from the use of a backlight array to provide regional brightness control can be mitigated or avoided entirely.

The illustration provided in FIG. 15 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 100 described above in reference to FIG. 1 may be representative of such a system, provided that pixel array 122 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 100 can also be controlled. This enables display system 100 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 16 illustrates two exemplary configurations of an adaptable light manipulator 1600 that includes an adaptable parallax barrier and a brightness regulation overlay implemented as a light manipulating LCD sandwich with manipulator grayscale pixels. In FIG. 16, the grayscale pixels map to the display pixels on a one-to-one basis, but that need not be the case.

A first exemplary configuration of adaptable light manipulator 1600 is shown above the section line denoted with reference numeral 1602. In accordance with the first exemplary configuration, a three-dimensional region 1604 is created with fully transparent or fully opaque manipulator pixels that provide parallax barrier functionality and a two-dimensional region 1606 is created having continuous medium gray manipulator pixels. The medium gray manipulator pixels operate to reduce the perceived brightness of two-dimensional region 1606 to better match that of three-dimensional region 1604. It is noted that in other example configurations, two-dimensional region 1606 could instead comprise a three-dimensional region having a number of views that is different than three-dimensional region 1604, thus also requiring brightness regulation.

In the first exemplary configuration, no boundary region compensation is performed. In the second exemplary configuration, which is shown below section line 1602, boundary region compensation is performed. For example, a boundary region 1610 within two-dimensional region 1606 may be "lightened" to a light gray to compensate for any diminution of light that might occur near the boundary with three-dimensional region 1604. In contrast, the grayscale level of an inner portion 1608 of two-dimensional region 1606 is maintained at the same medium gray level as in the portion of two-dimensional region 1606 above section line 1602. As a further example, a first boundary region 1612 and a second boundary region 1614 within three-dimensional region 1604 comprise darker and lighter gray transitional areas, respectively, to account for light dispersion from two-dimensional region 1606. In contrast, an inner portion 1616 of three-dimensional region 1604 includes only fully transparent or fully opaque manipulator pixels consistent with a parallax barrier configuration and no brightness regulation.

In one embodiment, the configuration of adaptable light manipulator 1600 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 1600 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 16), adaptable light manipulator 1600 is implemented as an integrated adaptable parallax barrier and brightness regulation overlay. However, in alternate embodiments, adaptable light manipulator 1600 is implemented using an adaptable parallax barrier panel and an independent brightness regulation overlay panel.

B. Example Display Systems Using Adaptable Lenticular Lenses

In display systems in accordance with further embodiments, rather than using an adaptable parallax barrier to perform light manipulation in support of multiple viewing configurations, an adaptable lenticular lens may be used. For example, with respect to example display system 100 of FIG. 1, adaptable parallax barrier 124 may be replaced with an adaptable lenticular lens. Likewise, with respect to example display system 1300 of FIG. 13, adaptable parallax barrier 1326 may be replaced with an adaptable lenticular lens.

FIG. 17 shows a perspective view of an adaptable lenticular lens 1700 in accordance with an embodiment. As shown in FIG. 17, adaptable lenticular lens 1700 includes a sub-lens array 1702. Sub-lens array 1702 includes a plurality of sub-lenses 1704 arranged in a two-dimensional array (e.g., arranged side-by-side in a row). Each sub-lens 1704 is shown in FIG. 17 as generally cylindrical in shape and having a substantially semi-circular cross-section, but in other embodiments may have other shapes. In FIG. 17, sub-lens array 1702 is shown to include eight sub-lenses for illustrative purposes and is not intended to be limiting. For instance, sub-lens array 1702 may include any number (e.g., hundreds, thousands, etc.) of sub-lenses 1704. FIG. 18 shows a side view of adaptable lenticular lens 1700. In FIG. 18, light may be passed through adaptable lenticular lens 1700 in the direction of dotted arrow 1802 to be diverted. Adaptable lenticular lens 1700 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in the aforementioned, incorporated U.S. patent application Ser. No. 12/774,307, filed on May 5, 2010, and entitled "Display with Elastic Light Manipulator."

C. Example Display Systems Using Multiple Light Manipulators

Display systems in accordance with further embodiments may include multiple layers of light manipulators. Such display systems may enable multiple three-dimensional images to be displayed in a viewing space. The multiple light manipulating layers may enable spatial separation of the images. For instance, in accordance with one embodiment, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple light manipulator layers may be configured to display any number of spatially separated three-dimensional images as desired for a particular application (e.g., according to a number and spacing of viewers in the viewing space, etc.).

FIG. 19 is a block diagram of a display system 1900 that includes multiple light manipulator layers in accordance with an embodiment. As shown in FIG. 19, display system 1900 includes driver circuitry 1902 and a screen 1904, wherein screen 1904 includes a pixel array 1922, a first light manipulator 1924 and a second light manipulator 1926. As shown in FIG. 19, first light manipulator 1924 includes first light manipulator elements 1942 and second light manipulator 1926 includes second light manipulator elements 1944. Furthermore, as shown in FIG. 19, driver circuitry 1902 includes pixel array driver circuitry 1912 and light manipulator driver circuitry 1914.

Light 1932 is received at first light manipulator 1924 from pixel array 1922. Pixel array driver circuitry 1912 may generate drive signals 1952 based on a control signal 1908 received from control circuitry (not shown in FIG. 19) and drive signals 1952 may be received by pixel array 1922 to generate light 1932. Each pixel of pixel array 1922 may generate light that is received at first light manipulator 1924. In an embodiment, pixel array driver circuitry 1912 may generate drive signals 1952 to cause pixel array 1922 to emit light 1932 containing a plurality of images corresponding to the sets of pixels.

First light manipulator 1924 may be configured to manipulate light 1932 received from pixel array 1922. As shown in FIG. 19, first light manipulator 1924 includes light manipulator elements 1942 configured to perform manipulating (e.g., filtering, diverting, etc.) of light 1932 to generate manipulated light 1934. Light manipulator elements 1942 may optionally be configurable to adjust the manipulating performed by first light manipulator 1924. First light manipulator 1924 may perform filtering in a similar manner as an adaptable parallax barrier described above or in other manner. In another embodiment, first light manipulator 1924 may include a lenticular lens that diverts light 1932 to perform light manipulating, generating manipulated light 1934. In an embodiment, light manipulator driver circuitry 1914 may generate drive signals 1954 based on control signal 1908 received by driver circuitry 1902 to cause light manipulator elements 1942 to manipulate light 1932 as desired.

Manipulated light 1934 is received by second light manipulator 1926 to generate manipulated light 1936 that includes a plurality of three-dimensional images $1962_1$-$1962_n$ formed in a viewing space 1906. As shown in FIG. 19, second light manipulator 1926 includes light manipulator elements 1944 configured to perform manipulating of manipulated light 1934 to generate manipulated light 1936. Light manipulator elements 1944 may optionally be configurable to adjust the manipulating performed by second light manipulator 1926. In an embodiment, light manipulator driver circuitry 1914 may generate drive signals 1956 based on control signal 1908 to cause light manipulator elements 1944 to manipulate manipulated light 1934 to generate manipulated light 1936 including three-dimensional images $1962_1$-$1962_n$ as desired. In embodiments, second light manipulator 1926 may include an adaptable parallax barrier or lenticular lens configured to manipulate manipulated light 1934 to generate manipulated light 1936.

As such, screen 1904 of display system 1900 supports multiple viewers with media content in the form of three-dimensional images or views. Screen 1904 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 1924 and 1926 each cause three-dimensional media content to be presented to a corresponding viewer via a corresponding area of screen 1904, with each viewer being enabled to view corresponding media content without viewing media content directed to other viewers. Furthermore, the areas of screen 1904 that provide the various three-dimensional views of media content overlap each other at least in part. In the embodiment of FIG. 19, the areas may be the same area. As such, multiple three-dimensional views that are each viewable by a corresponding viewer may be delivered by a single screen. Embodiments of display system 1900 may also be configured to generate two-dimensional views, as well as any combination of one or more two-dimensional views simultaneously with one or more three-dimensional views.

FIG. 20 shows a block diagram of a display system 2000, which is a further example of a display system that includes multiple light manipulator layers. Like display system 1900 of FIG. 19, display system 2000 is configured to display multiple three-dimensional images $2062_1$-$2062_n$ in a viewing space 2006 in a spatially separated manner. As shown in FIG. 20, display system 2000 includes driver circuitry 2002 and a screen 2004, wherein screen 2004 includes a light generator 2022, a first light manipulator 2024, a second light manipulator 2026 and a pixel array 2028. As shown in FIG. 20, light generator 2022 optionally includes a backlight array 2042, first light manipulator 2024 includes first light manipulator elements 2044, and second light manipulator 2026 includes second light manipulator elements 2046. Furthermore, as shown in FIG. 20, driver circuitry 2002 receives control signals 2008 and includes light generator driver circuitry 2012, light manipulator driver circuitry 2014, and pixel array driver circuitry 2016. Light generator driver circuitry 2012, light manipulator driver circuitry 2014, and pixel array driver circuitry 2016 may generate drive signals to perform their respective functions based on control signals 2008. As shown in FIG. 20, first and second light manipulators 2024 and 2026 are positioned between light generator 2022 and pixel array 2028. In another embodiment, pixel array 2028 may instead be located between first and second light manipulators 2024 and 2026.

III. Coordinated Driving Scheme for Display Systems Having Adaptable Light Manipulators The foregoing section described a variety of display systems that utilize at least one adaptable light manipulator to achieve a variety of different viewing configurations of a display screen. To achieve such viewing configurations, however, coordinated driving of at least the adaptable light manipulator and a corresponding pixel array must be provided. Furthermore, in display systems that also utilize non-uniform light generation in support of simultaneous regional viewing of mixed two-dimensional and/or three-dimensional content types, coordinated driving of the adaptable light manipulator, the corresponding pixel array, and the non-uniform light generator must be provided. This section will describe exemplary systems and methods that provide such coordinated driving of screen elements.

For example, FIG. 21 is a block diagram of a display system 2100 that provides coordinated driving of an adaptable light manipulator and a pixel array in accordance with an embodiment. As shown in FIG. 21, display system 2100 includes control circuitry 2102, driver circuitry 2104 and a screen 2106.

Screen 2106 includes an adaptable light manipulator 2132 and a pixel array 2134. In one implementation, adaptable light manipulator 2132 comprises an adaptable parallax barrier, in which case screen 2106 may be similar to screen 104 as described above in reference to FIG. 1. In another implementation, adaptable light manipulator 2132 comprises an adaptable lenticular lens such as that described above in reference to FIGS. 17 and 18. In a still further implementation, adaptable light manipulator 2132 comprises multiple light manipulator layers, wherein at least one light manipulator layer is adaptable, in which case screen 2106 may be similar to screen 1904 as described above in reference to FIG. 19.

As described in the preceding section, adaptable light manipulator 2132 can be arranged or configured to support a variety of different viewing configurations. For example, in an embodiment in which adaptable light manipulator 2132 comprises an adaptable parallax barrier, adaptable light manipulator 2132 may be placed in a state that supports viewing of two-dimensional images, three-dimensional images, or a mixture of two-dimensional and three-dimensional images displayed in different viewing regions. As also described in the preceding section, pixel array 2134 may be controlled to map pixels of an image to display pixels in a manner that is consistent with a particular viewing configuration currently supported by adaptable light manipulator 2132. Such coordinated control of adaptable light manipulator 2132 and pixel array 2134 is provided by control circuitry 2102.

As shown in FIG. 21, control circuitry 2102 includes media delivery circuitry 2112, viewing configuration selection circuitry 2114 and coordinated driver control circuitry 2116. Media delivery circuitry 2112 is configured to obtain one or more images for display by display system 2100 via screen 2106. The images may be static images or a series of images that taken together comprise a video stream. Such images may be represented as digital or analog signals.

In one embodiment, the images delivered by media delivery circuitry 2112 may be categorized into at least three different content types: (1) two-dimensional content, comprising a single frame that provides a single view of a subject (for a static image) or a series of frames that provide a single view of a subject (for video); (2) single-view three-dimensional content, comprising two views of a subject, each view comprising a single frame (for a static image) or a series of frames (for video); and (3) multi-view three-dimensional content, comprising some integer multiple of two views of a subject (e.g., four views, six views, eight views, etc.), each view comprising a single frame (for a static image) or a series of frames (for video).

Viewing configuration selection circuitry 2114 is configured to receive one or more inputs (examples of which are described below) and, based on such inputs, select one of a plurality of different viewing configurations for viewing content delivered by media delivery circuitry 2112.

For an embodiment that does not support regional viewing of mixed two-dimensional and/or three-dimensional content types, a particular viewing configuration may be specified or defined by a number of factors including, but by no means limited to: (1) the type of content to be viewed (e.g., two-dimensional, single-view three-dimensional, or multi-view three dimensional), (2) a resolution (number of display pixels to be used to represent image pixels) to be used in displaying the content to be viewed, (3) a location of one or more viewers of the content; and (4) a head orientation of one or more viewers of the content. For an embodiment that does support regional viewing of mixed two-dimensional and/or three-dimensional content types, a particular viewing configuration may comprise one or more region definitions, each region definition identifying some portion of the display area of the screen (wherein the portion may be the entirety of the display area of the screen or some subset thereof). For each region so defined, each of the foregoing factors may then be specified (i.e., type of content to be viewed in the region, resolution of the content to be viewed in the region, location of one or more viewers of the content displayed in the region, and head orientation of one or more viewers of the content displayed in the region).

Note that the foregoing manner of defining a viewing configuration supported by screen 2106 has been provided herein by way of example only. Numerous other methods for defining a viewing configuration may be used.

Coordinated driver control circuitry 2116 is configured to receive content to be displayed from media delivery circuitry 2112 and a selected viewing configuration from viewing configuration selection circuitry 2114. Based on this received information, coordinated driver control circuitry 2116 is configured to control driver circuitry 2104 to drive elements of screen 2106 in a manner that causes the content received from media delivery circuitry 2112 to be presented to one or more viewers in accordance with the selected viewing configuration. Coordinated driver control circuitry 2116 achieves this by controlling adaptable light manipulator driver circuitry 2122 within driver circuitry 2104 to send drive signals to adaptable light manipulator 2132 that place adaptable light manipulator 2132 in a state that supports the selected viewing configuration. Coordinated driver control circuitry 2116 further achieves this by controlling pixel array driver circuitry 2124 within driver circuitry 2104 to send drive signals to pixel array 2134 that cause image pixels associated with the content to be displayed to be mapped to display pixels of pixel array 2134 in a manner that supports the selected viewing configuration.

For example, assume that media delivery circuitry 2112 delivers a first content stream and a second content stream. The first content stream is a single-view three-dimensional content stream that includes two series of frames, each depicting a different camera view of a first subject. The second content stream is a two-dimensional content stream that includes a series of frames that depict a single camera view of a second subject. Further assume that the viewing configuration selected by viewing configuration selection circuitry 2114 specifies a first display region for viewing the first content stream and a second display region for viewing the second content stream. In this case, coordinated driver control circuitry 2116 may control adaptable light manipulator driver circuitry 2122 to send drive signals to adaptable light manipulator 2132 that place adaptable light manipulator 2132 in a state that supports this viewing configuration. For example, in an embodiment in which adaptable light manipulator 2132 is an adaptable parallax barrier, coordinated driver control circuitry 2116 may control adaptable light manipulator driver circuitry 2122 to send drive signals to adaptable light manipulator 2132 that place adaptable light manipulator 2132 in a state such as that shown for adaptable parallax barrier 400 in FIG. 4, wherein the first display region for viewing the first content stream is supported by first region 402 of barrier element array 202 and the second display region for viewing the second content stream is supported by second region 404 of barrier element array 202.

In further accordance with this example, coordinated driver control circuitry 2116 may control pixel array driver circuitry 2124 to send drive signals to pixel array 2134 that cause image pixels associated with the first and second content streams to be mapped to display pixels of pixel array 2134 in a manner that supports the selected viewing configuration. For example, with continued reference to FIG. 4, coordinated driver control circuitry 2116 may control pixel array driver circuitry 2124 to send drive signals to pixel array 2134 that cause image pixels associated with both views included in the first content stream to be mapped in an interleaved fashion to the display pixels associated with a region of pixel array 2134 that is aligned with first region 402 of barrier element array 202. Such mapping may be along the lines shown in the example of FIG. 9, which is one representative example of image-to-display pixel mapping for three-dimensional viewing. Furthermore, coordinated driver control circuitry 2116 may control pixel array driver circuitry 2124 to send drive signals to pixel array 2134 that cause image pixels associated with the single view included in the second content stream to be mapped to the display pixels associated with a region of pixel array 2134 that is aligned with second region 404 of barrier element array 202. Such mapping may be along the lines shown in the example of FIG. 8, which is one representative example of image-to-display pixel mapping for two-dimensional viewing.

Of course, this is but only a single example of how coordinated driver control circuitry 2116 can cause adaptable light manipulator driver circuitry 2122 and pixel array driver circuitry 2124 to send drive signals in a coordinated manner to cause elements of screen 2106 to present media content using a selected viewing configuration. Such coordinated signaling may be used to achieve any of the various viewing configurations provided by any of the adaptable two-dimensional/three-dimensional display systems described in the preceding section that include an adaptable light manipulator and a pixel array.

FIG. 22 is a block diagram of a display system 2200 that provides coordinated driving of an adaptable light manipulator, a pixel array and a light generator in accordance with an embodiment. As shown in FIG. 22, display system 2200 includes control circuitry 2202, driver circuitry 2204 and a screen 2206.

Screen 2206 includes an adaptable light manipulator 2232, a pixel array 2234 and a light generator 2236. In one implementation, adaptable light manipulator 2232 comprises an adaptable parallax barrier, in which case screen 2206 may be similar to screen 1104 as described above in reference to FIG. 11 or in which case display system 2200 may be similar to display system 1300 as described above in reference to FIG. 13. In another implementation, adaptable light manipulator 2232 comprises an adaptable lenticular lens such as that described above in reference to FIGS. 17 and 18. In a still further implementation, adaptable light manipulator 2232 comprises multiple light manipulator layers, wherein at least one light manipulator layer is adaptable, in which case screen 2106 may be similar to screen 2004 as described above in reference to FIG. 20.

As described in the preceding section, adaptable light manipulator 2232 can be arranged or configured to support a variety of different viewing configurations. For example, in an embodiment in which adaptable light manipulator 2232 comprises an adaptable parallax barrier, adaptable light manipulator 2232 may be placed in a state that supports viewing of two-dimensional images, three-dimensional images, or a mixture of two-dimensional and three-dimensional images displayed in different viewing regions. As also described in the preceding section, pixel array 2234 may be controlled to map pixels of an image to display pixels in a manner that is consistent with a particular viewing configuration currently supported by adaptable light manipulator. As still further described in the preceding section, where the viewing configuration supported by the adaptable light manipulator 2232 is one that provides for simultaneous display of different two-dimensional and/or three-dimensional content in different display regions, light generator 2236 may be controlled to provide non-uniform luminosity across such display regions in support of the particular viewing configuration. Such coordinated control of adaptable light manipulator 2232, pixel array 2234 and light generator 2236 is provided by control circuitry 2202.

As shown in FIG. 22, control circuitry 2202 includes media delivery circuitry 2212, viewing configuration selection circuitry 2214 and coordinated driver control circuitry 2216. Media delivery circuitry 2212 operates in a like manner to media delivery circuitry 2112 as described above in reference to FIG. 21. Thus, media delivery circuitry 2212 is configured to obtain one or more images for display by display system 2200 via screen 2206. In one embodiment, images delivered by media delivery circuitry 2212 may be categorized into at least two-dimensional content, single-view three-dimensional content, and multi-view three-dimensional content.

Viewing configuration selection circuitry 2214 operates in a like manner to viewing configuration selection circuitry 2114 as described above in reference to FIG. 21. Thus, viewing configuration selection circuitry 2214 is configured to receive one or more inputs (examples of which are described below) and, based on such inputs, select one of a plurality of different viewing configurations for viewing content delivered by media delivery circuitry 2212. Various example manners for defining a viewing configuration supported by an adaptable screen such as screen 2206 were described above in reference to FIG. 21.

Coordinated driver control circuitry 2216 is configured to receive content to be displayed from media delivery circuitry 2212 and a selected viewing configuration from viewing configuration selection circuitry 2214. Based on this received information, coordinated driver control circuitry 2216 is configured to control driver circuitry 2204 to drive elements of screen 2206 in a manner that causes the content received from media delivery circuitry 2212 to be presented to one or more viewers in accordance with the selected viewing configuration. Coordinated driver control circuitry 2216 achieves this by controlling adaptable light manipulator driver circuitry 2222 within driver circuitry 2204 to send drive signals to adaptable light manipulator 2232 that place adaptable light manipulator 2232 in a state that supports the selected viewing configuration. Coordinated driver control circuitry 2216 further achieves this by controlling pixel array driver circuitry 2224 within driver circuitry 2204 to send drive signals to pixel array 2234 that cause image pixels associated with the content to be displayed to be mapped to display pixels of pixel array 2234 in a manner that supports the selected viewing configuration. Coordinated driver control circuitry 2216 further achieves this by controlling light generator driver circuitry 2226 within driver circuitry 2204 to send drive signals to light generator 2236 that cause light generator to produce light in a manner (e.g., a non-uniform manner) that supports the selected viewing configuration.

For example, assume that media delivery circuitry 2212 delivers a first content stream, a second content stream and a third content stream. The first content stream is a multi-view three-dimensional content stream that includes four series of frames, each depicting a different camera view of a first subject. The second content stream is a single-view three-dimensional content stream that includes two series of frames, each depicting a different camera view of a second subject. The third content stream is a two-dimensional content stream that includes a series of frames that depict a single camera view of a third subject. Further assume that the viewing configuration selected by viewing configuration selection circuitry 2114 specifies a first display region for viewing the first content stream, a second display region for viewing the second content stream, and a third display region for viewing the third content stream.

In this case, coordinated driver control circuitry 2216 may control adaptable light manipulator driver circuitry 2222 to send drive signals to adaptable light manipulator 2232 that place adaptable light manipulator 2232 in a state that supports this viewing configuration. For example, in an embodiment in which adaptable light manipulator 2232 is an adaptable parallax barrier, coordinated driver control circuitry 2216 may control adaptable light manipulator driver circuitry 2222 to send drive signals to adaptable light manipulator 2232 that place adaptable light manipulator 2232 in a state such as that shown for adaptable parallax barrier 1204 in FIG. 12. In accordance with this state, the first display region for viewing the first content stream may be supported by first portion 1224 of barrier element array 1222, the second display region for viewing the second content stream may be supported by second portion 1226 of barrier element array 1226 and the third display region for viewing the third content stream may be supported by third portion 1228 of barrier element array 1222.

In further accordance with this example, coordinated driver control circuitry 2216 may control pixel array driver circuitry 2224 to send drive signals to pixel array 2234 that cause image pixels associated with the first, second and third content streams to be mapped to display pixels of pixel array 2234 in a manner that supports the selected viewing configuration. For example, in an embodiment in which pixel array 2234 is the same as pixel array 1232 of FIG. 12, coordinated driver control circuitry 2216 may control pixel array driver circuitry 2224 to send drive signals that cause image pixels associated with all four views included in the first content stream to be mapped in an interleaved fashion to the display pixels associated with first portion 1234 of pixel array 1232 that is aligned with first portion 1224 of barrier element array 1222. Furthermore, coordinated driver control circuitry 2216 may control pixel array driver circuitry 2224 to send drive signals that cause image pixels associated with the two views included in the second content stream to be mapped in an interleaved fashion to the display pixels associated with second portion 1236 of pixel array 1234 that is aligned with second portion 1226 of barrier element array 1222. Additionally, coordinated driver control circuitry 2216 may control pixel array driver circuitry 2224 to send drive signals that cause image pixels associated with the single view included in the third content stream to be mapped to the display pixels associated with third portion 1238 of pixel array 1234 that is aligned with third portion 1228 of barrier element array 1222.

In still further accordance with this example, coordinated driver control circuitry 2216 may control light generator driver circuitry 2226 to send drive signals to light generator 2236 that cause light generator 2236 to produce light in a manner (e.g., a non-uniform manner) that supports the selected viewing configuration. For example, in an embodiment in which light generator 2236 is the same as backlight array 1212 of FIG. 12, coordinated driver control circuitry 2216 may control light generator driver circuitry 2226 to send drive signals that cause a first level of luminosity to be produced by first portion 1214 of backlight array 1212 that is aligned with first portion 1224 of barrier element array 1222. Furthermore, coordinated driver control circuitry 2216 may control light generator driver circuitry 2226 to send drive signals that cause a second level of luminosity to be produced by second portion 1216 of backlight array 1212 that is aligned with second portion 1226 of barrier element array 1222. Additionally, coordinated driver control circuitry 2216 may control light generator driver circuitry 2226 to send drive signals that cause a third level of luminosity to be produced by third portion 1218 of backlight array 1212 that is aligned with third portion 1228 of barrier element array 1222. In one embodiment, the first level of luminosity exceeds the second level of luminosity and the second level of luminosity exceeds the third level of luminosity.

Of course, this is but only a single example of how coordinated driver control circuitry 2216 can cause adaptable light manipulator driver circuitry 2222, pixel array driver circuitry 2224 and light generator driver circuitry 2226 to send drive signals in a coordinated manner to enable elements of screen 2206 to present media content using a selected viewing configuration. Such coordinated signaling may be used to achieve any of the various viewing configurations provided by any of the adaptable two-dimensional/three-dimensional display systems described in the preceding section.

In the preceding section, additional approaches to providing non-uniform brightness or luminosity across different display regions were described that can be used in addition to, or instead of, a backlight array of individually controllable light sources. Such additional approaches can also help reduce backlighting dispersion across distinct regions. Such additional approaches include, for example, selectively controlling the brightness or intensity of self-illuminating pixels in a pixel array, such as OLED/PLED pixels, and selectively controlling a grayscale level of pixels in a brightness regulation overlay. It will be appreciated by persons skilled in the relevant art(s) that, in embodiments of display systems that include such features, coordinated driver control circuitry can be provided that control driver circuitry associated with such self-illuminating pixels and/or overlay pixels to generate drive signals that cause the self-illuminating pixels and/or overlay pixels to be placed in a state that supports a particular viewing configuration.

As discussed above in reference to FIGS. 21 and 22, viewing configuration selection circuitry 2114 and viewer configuration selection circuitry 2224 each operate to receive one or more inputs and, based on such inputs, select one of a plurality of different viewing configurations for viewing content delivered by associated media delivery circuitry. FIG. 23 is a block diagram showing example inputs to viewing configuration selection circuitry 2300 (which may comprise, for example, viewing configuration selection circuitry 2114 or viewer configuration selection circuitry 2224). Each of these inputs may be used alone or in combination by viewing configuration selection circuitry 2330 to select one of a plurality of different viewing configurations. As shown in FIG. 23, such inputs may include for example and without limitation viewer input 2302, viewer location(s) 2304, viewer head orientation(s) 2306, display capability information 2308, media attributes 2310, channel information 2312, and application/operating system (OS) commands 2314. Based on the processing of one or more of inputs 2302, 2304, 2306, 2308, 2310, 2312 and 2314, viewing configuration selection logic 2300 produces a selected viewing configuration 2316. Each of these example input types will now be briefly described. Persons skilled in the relevant art(s) will appreciate that other types of input may alternatively or additionally be used to select a viewing configuration.

Viewer input 2302 is intended to represent any type of input received from a user which could be used to provide a basis for selecting a particular viewing configuration. Such viewer input may include input received via a remote control device or any other suitable user interface. Such viewer input may comprise stored user preference information indicating how media content should be delivered to an adaptable display screen. Such viewer input may also comprise real-time input from a user seeking to adjust how media content should be delivered to an adaptable display screen. The viewer input may be received from a single user or multiple users.

Viewer location(s) 2304 is intended to represent information concerning a location of one or more viewers of an adaptable display screen. As discussed in the preceding section and in various U.S. patent applications previously incorporated by reference herein, the state of an adaptable light manipulator may advantageously be configured to project three-dimensional images to a viewer at a known location or "sweet spot," and the state of the adaptable light manipulator may thereafter be changed in response to the viewer changing location. In adaptable display systems such as those described in the preceding section that can simultaneously provide two different three-dimensional images to two different viewers, location information associated with both users may advantageously be used to configure the state of one or more adaptable light manipulators used to implement the system. Location information associated with a particular viewer may be obtained in a variety of ways, including using different types of sensors (e.g., cameras, motion sensors, microphones or the like) or by using tracking systems such as those that wirelessly track an object (e.g., headset, remote control, or the like) currently being held or worn by a viewer.

Viewer head orientation(s) 2306 is intended to represent information concerning a head orientation of one or more viewers of an adaptable display screen. As discussed in the preceding section and in various U.S. patent applications previously incorporated by reference herein, the state of an adaptable display screen may advantageously be configured to project two-dimensional and three dimensional images in a manner that corresponds to the current orientation of a head of one or more viewers (e.g., see the example arrangement of adaptable parallax barrier 500 as discussed above in reference to FIG. 5). Head orientation information associated with a particular viewer may be obtained in a variety of ways, including using different types of sensors (e.g., cameras, motion sensors, or the like) or by using tracking systems such as those that wirelessly track an object (e.g., headset) that is currently attached to or worn on a user's head.

Display capability information 2308 is intended to represent any information about an adaptable display screen that may impact the types of viewing configurations supported by such a display screen. Such display capability information 2308 may include, for example and without limitation, an identification of configurable modes supported by an adaptable light manipulator (e.g., a list of different parallax barrier states achievable by an adaptable parallax barrier or a barrier element resolution associated with an adaptable parallax barrier, a list or other identification of lenticular lens states achievable by a stretchable lenticular lens, or the like), an indication of whether regional delivery of two-dimensional and/or three-dimensional content is supported by the display, a set of display resolutions supported by a pixel array, a set of refresh rates supported by a pixel array, an identification of configurable modes supported by a backlight array or non-uniform light manipulator (e.g., a brightness regulation overlay), an identification of a number of content streams that may be simultaneously displayed, or the like.

Media attributes 2310 is intended to represent attributes associated with media content to be displayed by an adaptable display screen (e.g., media content delivered by media delivery circuitry 2112 of FIG. 21 or media deliver circuitry 2212 of FIG. 22) that may impact the selection of a particular viewer configuration. For example, if the media content is two-dimensional content, then a two-dimensional viewing configuration may be selected. If the media content is single-view three-dimensional media content, then a single-view three-dimensional viewing configuration may be selected. If the media content is multi-view three-dimensional media content, then a multi-view three-dimensional viewing configuration may be selected. If the media content includes a mix of two-dimensional and three-dimensional content types, then a regional viewing scheme may be selected to provide different regions for viewing the different viewing types. Media attributes 2310 may also include a resolution of images associated with one or more views. Still other media attributes may be used to render a viewing configuration selection.

Channel information 2312 is intended to represent any information about a channel or interface over which is received media content to be displayed on an adaptable display screen. Such channel information may bear on the selection of a particular viewing configuration. For example, if the channel is impaired or bandwidth constrained such that only a limited amount of media content can be transferred thereby, then a viewing configuration that requires fewer views than another viewing configuration may be selected (e.g., two-dimensional viewing may be selected over single-view three-dimensional viewing or single-view three-dimensional viewing may be selected over multi-view three dimensional viewing). If a channel over which a particular view or views is being received is impaired or bandwidth constrained, then only those views may be dropped from a particular viewing configuration. As another example, if a channel over which certain media content is being received is impaired or bandwidth constrained, a lower resolution may be used to display such media content.

Application/OS commands 2314 is intended to represent commands received by a software application or OS running on a device coupled to or comprising viewing configuration selection logic 2300, wherein the application or OS is directing how media content is to be delivered to an adaptable display screen.

FIG. 24 depicts a flowchart 2400 of a method for providing coordinated control of an adaptable light manipulator and a pixel array that together comprise a display system in accordance with an embodiment. The method of flowchart 2400 may be performed, for example and without limitation, by display system 2100 as described above in reference to FIG. 21. However, the method is not limited to that embodiment and may be implemented by other display systems.

As shown in FIG. 24, the method of flowchart 2400 begins at step 2402, in which information indicative of a particular one of a plurality of viewing configurations and media content to be displayed in accordance therewith is received. This step may be performed, for example, when coordinated driver control circuitry 2116 receives a selected viewing configuration from viewing configuration selection circuitry 2114 and media content to be displayed in accordance with the selected viewing configuration from media delivery circuitry 2112. The plurality of viewing configurations may include, for example, a first viewing configuration and a second viewing configuration, and the selected viewing configuration may comprise either the first viewing configuration or the second viewing configuration. Of course, many, many more than two viewing configurations may be supported by the display system.

At step 2404, drive signals are caused to be sent to an adaptable light manipulator to place the adaptable light manipulator in a mode that supports the particular viewing configuration. This step may be performed, for example, when coordinated driver control circuitry 2116 controls adaptable light manipulator driver circuitry 2122 to send drive signals to adaptable light manipulator 2132 to place adaptable light manipulator 2132 in a mode that supports the particular viewing configuration. The mode into which the adaptable light manipulator is place may support either a first viewing configuration or a second viewing configuration as noted above. In certain embodiments, in accordance with the first viewing configuration, the adaptable light manipulator is placed in a first active mode (i.e., a first mode in which the adaptable light manipulator is filtering light) and in accordance with the second viewing configuration, the adaptable light manipulator is placed in a second active mode (i.e., a second mode in which the adaptable light manipulator is filtering light that is different than the first mode).

At step 2406, drive signals are caused to be sent to a pixel array that causes the media content to be delivered to the pixel array in a mode that supports the particular viewing configuration. This step may be performed, for example, when coordinated driver control circuitry 2116 controls pixel array driver circuitry 2124 to send drive signals to pixel array 2134 that cause the media content to be delivered to pixel array 2134 in a mode that supports the particular viewing configuration. The mode in which the media content is delivered to the pixel array may support either a first viewing configuration or a second viewing configuration as noted above.

FIG. 25 depicts a flowchart 2500 of a method for providing coordinated control of an adaptable light manipulator, a pixel array and a light generator that together comprise a display system in accordance with an embodiment. The method of flowchart 2500 may be performed, for example and without limitation, by display system 2200 as described above in reference to FIG. 22. However, the method is not limited to that embodiment and may be implemented by other display systems.

As shown in FIG. 25, the method of flowchart 2500 begins at step 2502, in which information indicative of a particular one of a plurality of viewing configurations and media content to be displayed in accordance therewith is received. This step may be performed, for example, when coordinated driver control circuitry 2216 receives a selected viewing configuration from viewing configuration selection circuitry 2214 and media content to be displayed in accordance with the selected viewing configuration from media delivery circuitry 2212. The plurality of viewing configurations may include, for example, a first viewing configuration and a second viewing configuration, and the selected viewing configuration may comprise either the first viewing configuration or the second viewing configuration. Of course, many, many more than two viewing configurations may be supported by the display system.

At step 2504, drive signals are caused to be sent to an adaptable light manipulator to place the adaptable light manipulator in a mode that supports the particular viewing configuration. This step may be performed, for example, when coordinated driver control circuitry 2216 controls adaptable light manipulator driver circuitry 2222 to send drive signals to adaptable light manipulator 2232 to place adaptable light manipulator 2232 in a mode that supports the particular viewing configuration. The mode into which the adaptable light manipulator is place may support either a first viewing configuration or a second viewing configuration as noted above. In certain embodiments, in accordance with the first viewing configuration, the adaptable light manipulator is placed in a first active mode (i.e., a first mode in which the adaptable light manipulator is filtering light) and in accordance with the second viewing configuration, the adaptable light manipulator is placed in a second active mode (i.e., a second mode in which the adaptable light manipulator is filtering light that is different than the first mode).

At step 2506, drive signals are caused to be sent to a pixel array that cause the media content to be delivered to the pixel array in a mode that supports the particular viewing configuration. This step may be performed, for example, when coordinated driver control circuitry 2216 controls pixel array driver circuitry 2224 to send drive signals to pixel array 2234 that cause the media content to be delivered to pixel array 2234 in a mode that supports the particular viewing configuration. The mode in which the media content is delivered to the pixel array may support either a first viewing configuration or a second viewing configuration as noted above.

At step 2508, drive signals are caused to be sent to a light generator that cause the light generator to produce light for illuminating the pixel array in a mode that supports the particular viewing configuration. This step may be performed, for example, when coordinated driver control circuitry 2216 controls light generator driver circuitry 2226 to send drive signals to light generator 2236 that causes light generator 2236 to produce light for illuminating pixel array 2234 in a mode that supports the particular viewing configuration. The mode in which the media content is delivered to the pixel array may support either a first viewing configuration or a second viewing configuration as noted above.

FIG. 26 is a block diagram of an example practical implementation of a display system 2600 in accordance with an embodiment of the present invention. As shown in FIG. 26, display system 2600 generally comprises control circuitry 2602, driver circuitry 2604 and a screen 2606.

As shown in FIG. 26, control circuitry 2602 includes a processing unit 2614, which may comprise one or more general-purpose or special-purpose processors or one or more processing cores. Processing unit 2614 is connected to a communication infrastructure 2612, such as a communication bus. Control circuitry 2602 may also include a primary or main memory (not shown in FIG. 26), such as random access memory (RAM), that is connected to communication infrastructure 2612. The main memory may have control logic stored thereon for execution by processing unit 2614 as well as data stored thereon that may be input to or output by processing unit 2614 during execution of such control logic.

Control circuitry 2602 may also include one or more secondary storage devices (not shown in FIG. 26) that are connected to communication infrastructure 2612, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 2614 as well as data that may be input to or output by processing unit 2614 during execution of such control logic.

Control circuitry 2602 further includes a user input interface 2618, a viewer tracking unit 2616, and a media interface 2620. User input interface 2618 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Viewer tracking unit 2616 is intended to generally represent any type of functionality for determining or estimating a location of one or more viewers of display system 2600 and/or a head orientation of one or more viewers of display system 2600. Viewer tracking unit may perform such functions using different types of sensors (e.g., cameras, motion sensors, microphones or the like) or by using tracking systems such as those that wirelessly track an object (e.g., headset, remote control, or the like) currently being held or worn by a viewer.

Media interface 2620 is intended to represent any type of interface that is capable of receiving media content such as video content or image content. In certain implementations, media interface 2620 may comprise an interface for receiving media content from a remote source such as a broadcast media server, an on-demand media server, or the like. In such implementations, media interface 2620 may comprise, for example and without limitation, a wired or wireless internet or intranet connection, a satellite interface, a fiber interface, a coaxial cable interface, or a fiber-coaxial cable interface. Media interface 2620 may also comprise an interface for receiving media content from a local source such as a DVD or Blu-Ray disc player, a personal computer, a personal media player, smart phone, or the like. Media interface 2620 may be capable of retrieving video content from multiple sources.

Control circuitry 2602 further includes a communication interface 2622. Communication interface 2622 enables control circuitry 2602 to send control signals via a communication medium 2652 to another communication interface 2630 within driver circuitry 2604, thereby enabling control circuitry 2602 to control the operation of driver circuitry 2604. Communication medium 2652 may comprise any kind of wired or wireless communication medium suitable for transmitting such control signals.

As shown in FIG. 26, driver circuitry 2604 includes the aforementioned communication interface 2630 as well as pixel array driver circuitry 2632 and adaptable light manipulator driver circuitry 2634. Driver circuitry also optionally includes light generator driver circuitry 2636. Each of these driver circuitry elements is configured to receive control signals from control circuitry 2602 (via the link between communication interface 2622 and communication interface 2630) and, responsive thereto, to send selected drive signals to a corresponding hardware element within screen 2606, the drive signals causing the corresponding hardware element to operate in a particular manner. In particular, pixel array driver circuitry 2632 is configured to send selected drive signals to a pixel array 2642 within screen 2606, adaptable light manipulator driver circuitry 2634 is configured to send selected drive signals to an adaptable light manipulator 2644 within screen elements 2606, and optional light generator driver circuitry

2636 is configured to send selected drive signals to an optional light generator 2646 within screen 2606.

In one example mode of operation, processing unit 2614 operates pursuant to control logic to receive video content via media interface 2620 and to generate control signals necessary to cause driver circuitry 2604 to render such video content to screen 2606 in accordance with a selected viewing configuration. The control logic that is executed by processing unit 2614 may be retrieved, for example, from a primary memory or a secondary storage device connected to processing unit 2614 via communication infrastructure 2612 as discussed above. The control logic may also be retrieved from some other local or remote source. Where the control logic is stored on a computer readable medium, that computer readable medium may be referred to herein as a computer program product.

Among other features, driver circuitry 2604 may be controlled in a manner previously described to send coordinated drive signals necessary for simultaneously displaying two-dimensional images, three-dimensional images and multi-view three-dimensional content via different display regions of the screen. The manner in which pixel array 2642, adaptable light manipulator 2644 (e.g., an adaptable parallax barrier), and light generator 2646 may be manipulated in a coordinated fashion to perform this function was described previously herein. Note that in accordance with certain implementations (e.g., implementations in which pixel array comprises a OLED/PLED pixel array), screen 2606 need not include light generator 2646.

In one embodiment, at least part of the function of generating control signals necessary to cause pixel array 2642, adaptable light manipulator 2644 and light generator 2646 to render video content to screen 2606 in accordance with a selected viewing configuration is performed by drive signal processing circuitry 2638 which is integrated within driver circuitry 2604. Such circuitry may operate, for example, in conjunction with and/or under the control of processing unit 2614 to generate the necessary control signals.

In certain implementations, control circuitry 2602, driver circuitry 2604 and screen elements 2606 are all included within a single housing. For example and without limitation, all these elements may exist within a television, a laptop computer, a tablet computer, or a telephone. In accordance with such an implementation, the link 2652 formed between communication interfaces 2622 and 2630 may be replaced by a direction connection between driver circuitry 2604 and communication infrastructure 2612. In an alternate implementation, control circuitry 2602 is disposed within a first housing, such as set top box or personal computer, and driver circuitry 2604 and screen 2606 are disposed within a second housing, such as a television or computer monitor. The set top box may be any type of set top box including but not fiber, Internet, cable, satellite, or terrestrial digital.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system used with a display that includes a pixel array, a backlight array, and an adaptable light manipulator, the pixel array, the backlight array, and the adaptable light manipulator selectively providing a first viewing configuration and a second viewing configuration that is different from the first viewing configuration, the system comprising:

pixel array driver circuitry, coupled to the pixel array, that is controllable to selectively deliver pixel drive signals to the pixel array in either a first pixel mode or a second pixel mode, the first pixel mode supporting the first viewing configuration and the second pixel mode supporting the second viewing configuration;

backlight array driver circuitry, coupled to the backlight array, the backlight array comprising a two-dimensional array of light sources that are individually selectable and controllable to select a variable amount of light emitted thereby, each light source of the backlight array being capable of generating its own variable amount of light, the backlight array driver circuitry being controllable to selectively deliver backlight drive signals to the light sources of the backlight array in either a first backlight mode or a second backlight mode, the first backlight mode supporting the first viewing configuration and the second backlight mode supporting the second viewing configuration;

adaptable light manipulator driver circuitry, coupled to the adaptable light manipulator, that is controllable to selectively deliver manipulator drive signals to the adaptable light manipulator in either a first manipulator mode or a second manipulator mode, the first manipulator mode supporting the first viewing configuration and the second manipulator mode supporting the second viewing configuration, and the first manipulator mode and the second manipulator mode are both active manipulator modes; and control circuitry, coupled to the pixel array driver circuitry, the backlight array driver circuitry, and the adaptable light manipulator driver circuitry, that is operable to receive display information and, based on the received display information, selectively cause the delivery of the pixel drive signals, the backlight drive signals, and the manipulator drive signals either in the first pixel mode, the first backlight mode, and the first manipulator mode, or in the second pixel mode, the second backlight mode, and the second manipulator mode.

2. The system of claim 1, wherein the first backlight mode, the first pixel mode, and the first manipulator mode together provide a first configuration in a first region and a second configuration in a second region.

3. The system of claim 2, wherein the first configuration in the first region supports display of stereoscopic three-dimensional content formed from two camera views and the second configuration in the second region supports display of multi-view three-dimensional content formed from more than two camera views.

4. The system of claim 1, wherein the first pixel mode and the first manipulator mode together provide a first three-dimensional configuration.

5. The system of claim 1, wherein the second pixel mode and the second manipulator mode together provide a second three-dimensional configuration.

6. The system of claim 1, wherein the adaptable light manipulator comprises an adaptable lenticular lens and wherein the first manipulator mode corresponds to a first degree of stretching of the adaptable lenticular lens and the second manipulator mode corresponds to a second degree of stretching of the adaptable lenticular lens.

7. The system of claim 1, wherein the adaptable light manipulator comprises an adaptable parallax barrier comprising an array of barrier elements each of which may be selectively placed in a blocking or non-blocking state and wherein the first manipulator mode corresponds to a first configuration of the states of the barrier elements and the second manipulator mode corresponds to a second configuration of the states of the barrier elements.

8. The system of claim 1, wherein the display information comprises one or more of:
viewer input received from a viewer via a user interface,
information concerning a location of one or more viewers of the display,
information concerning a head orientation of one or more viewers of the display,
attributes associated with image content to be rendered to the display,
capability information associated with the display, and
information associated with a channel over which at least a portion of image content to be rendered to the display is being received.

9. A method used to drive a display having a first viewing configuration and a second viewing configuration that is different from the first viewing configuration, the display including a pixel array, a backlight array, and an adaptable light manipulator, the method comprising:
receiving viewing configuration information corresponding to either the first viewing configuration or the second viewing configuration;
selectively generating either a first viewing configuration signal or a second viewing configuration signal based on the viewing configuration information received;
delivering, to the adaptable light manipulator, whichever of the first viewing configuration signal or the second viewing configuration signal is generated;
selectively delivering, to individually addressable light sources of the backlight array, either first backlight array drive signals in conformance with the first viewing configuration signal, or second backlight array drive signals in conformance with the second viewing configuration signal, the individually addressable light sources of the backlight array each being capable of generating its own variable level of light in response to receiving a respective backlight array drive signal; and
selectively delivering, to the pixel array, either first pixel array drive signals in conformance with the first viewing configuration signal, or second pixel array drive signals in conformance with the second viewing configuration signal.

10. The method of claim 9, wherein receiving viewing configuration information corresponding to the first viewing configuration comprises receiving first regional viewing configuration information for a first display region and second regional viewing configuration information for a second display region.

11. The method of claim 9, wherein receiving the viewing configuration information corresponding to either the first viewing configuration or the second viewing configuration comprises:
receiving configuration information corresponding to either a first three-dimensional viewing configuration or a second three-dimensional viewing configuration.

12. The method of claim 9, wherein the adaptable light manipulator comprises an adaptable lenticular lens and wherein delivering, to the adaptable light manipulator, whichever of the first viewing configuration signal or the second viewing configuration signal is generated comprises delivering either a signal that corresponds to a first degree of stretching of the adaptable lenticular lens or a signal that corresponds to a second degree of stretching of the adaptable lenticular lens.

13. The method of claim 9, wherein the adaptable light manipulator comprises an adaptable parallax barrier comprising an array of barrier elements each of which may be selectively placed in a blocking or non-blocking state and wherein delivering, to the adaptable light manipulator, whichever of the first viewing configuration signal or the second viewing configuration signal is generated comprises delivering either a signal that corresponds to a first configuration of the states of the barrier elements or a signal that corresponds to a second configuration of the states of the barrier elements.

14. The method of claim 9, further comprising generating the viewing configuration information corresponding to either the first viewing configuration or the second viewing configuration based on one or more of:
viewer input received from a viewer via a user interface,
information concerning a location of one or more viewers of the display,
information concerning a head orientation of one or more viewers of the display,
attributes associated with image content to be rendered to the display,
capability information associated with the display, and
information associated with a channel over which at least a portion of image content to be rendered to the display is being received.

15. A system used with a display having a first viewing configuration and a second viewing configuration that is different from the first viewing configuration, the display includes a pixel array, an adaptable light manipulator, and a light generator, the system comprising:
control circuitry;
pixel array interface circuitry that is coupled to both the control circuitry and the pixel array;
manipulator interface circuitry that is coupled to both the control circuitry and the adaptable light manipulator; and
generator interface circuitry that is coupled to both the control circuitry and the light generator;
wherein the control circuitry responds to a first configuration signal by coordinating operations of the pixel array interface circuitry, the manipulator interface circuitry, and generator interface circuitry to cause delivery of a first viewing configuration,
wherein the control circuitry responds to a second configuration signal by coordinating operations of the pixel array interface circuitry, the manipulator interface circuitry, and the generator interface circuitry to cause delivery of a second viewing configuration, wherein the adaptable light manipulator is active in both the first and the second viewing configurations, and
wherein the light generator comprises an array of self-illuminating light elements, each of the self-illuminating light elements capable of generating its own variable level of light.

16. The system of claim 15, wherein the first viewing configuration comprises a first regional viewing configuration for a first region of the display and a second regional viewing configuration for a second region of the display.

17. The system of claim 15, wherein the control circuitry responds to the first configuration signal by coordinating operations of the pixel array interface circuitry and the manipulator interface circuitry to cause delivery of a first three-dimensional viewing configuration; and wherein the control circuitry responds to the second configuration signal by coordinating operations of the pixel array interface circuitry and the manipulator interface circuitry to cause delivery of a second three-dimensional viewing configuration.

18. The system of claim 17, wherein the first three-dimensional viewing configuration supports display of stereoscopic three-dimensional content formed from two camera views and the second three-dimensional viewing configuration supports display of multi-view three-dimensional content formed from more than two camera views.

19. The system of claim 15, wherein the generator interface circuitry causes the light generator to deliver a non-uniform light output corresponding to the first viewing configuration.

20. The system of claim 15, wherein the array of self-illuminating light elements and the light generator are integrated into an OLED.

21. The system of claim 15, further comprising a brightness regulation overlay that provides fully transparent, fully opaque, or various grayscale states for each pixel of the pixel array.

* * * * *